United States Patent [19]
Olson et al.

[11] Patent Number: 5,067,096
[45] Date of Patent: Nov. 19, 1991

[54] TARGET ENGAGEMENT SYSTEM FOR DETERMINING PROXIMITY TO A TARGET

[75] Inventors: David P. Olson, Mound; Jonathan C. Werder, Maple Grove, both of Minn.

[73] Assignee: Honeywell Inc., Minneapolis, Minn.

[21] Appl. No.: 582,574

[22] Filed: Sep. 14, 1990

[51] Int. Cl.$^5$ .............................................. G01S 15/00
[52] U.S. Cl. ..................................... 364/517; 102/425
[58] Field of Search ................. 364/517, 516; 367/93, 367/94; 102/420, 425

[56] References Cited

U.S. PATENT DOCUMENTS

| | | | |
|---|---|---|---|
| 4,377,811 | 3/1983 | Mooney, Jr. et al. | 364/517 |
| 4,449,127 | 5/1984 | Sanchez | 364/517 |
| 4,633,261 | 12/1986 | Kosaka et al. | 364/517 |

*Primary Examiner*—Salvatore Cangialosi
*Attorney, Agent, or Firm*—Merchant, Gould, Smith, Edell, Welter, & Schmidt

[57] ABSTRACT

A target engagement system uses target motion analysis to determine a target engagement decision for ground targets, such as vehicles. The input to the engagement system is the target azimuth as a function of time. A detect algorithm issues and records a detect azimuth when confirmation is made that a valid target is being tracked and legitimate azimuth information is being provided. The engagement algorithm then begins and records the time intervals it takes for the target to cross two sectors, each covering 20° and separate by 10°. Thus, first time interval is measured from detect azimuth to 20° after detect azimuth, and the second time interval is measured from 30° after detect azimuth to 50° after detect azimuth. When the first and second time intervals have been recorded, the ratio of the first time interval to the second time interval is calculated. If this ratio is greater than 2.0, then the target is estimated to be within range and is subsequently attacked. Otherwise, the target is greater than the range and no action is taken.

21 Claims, 13 Drawing Sheets

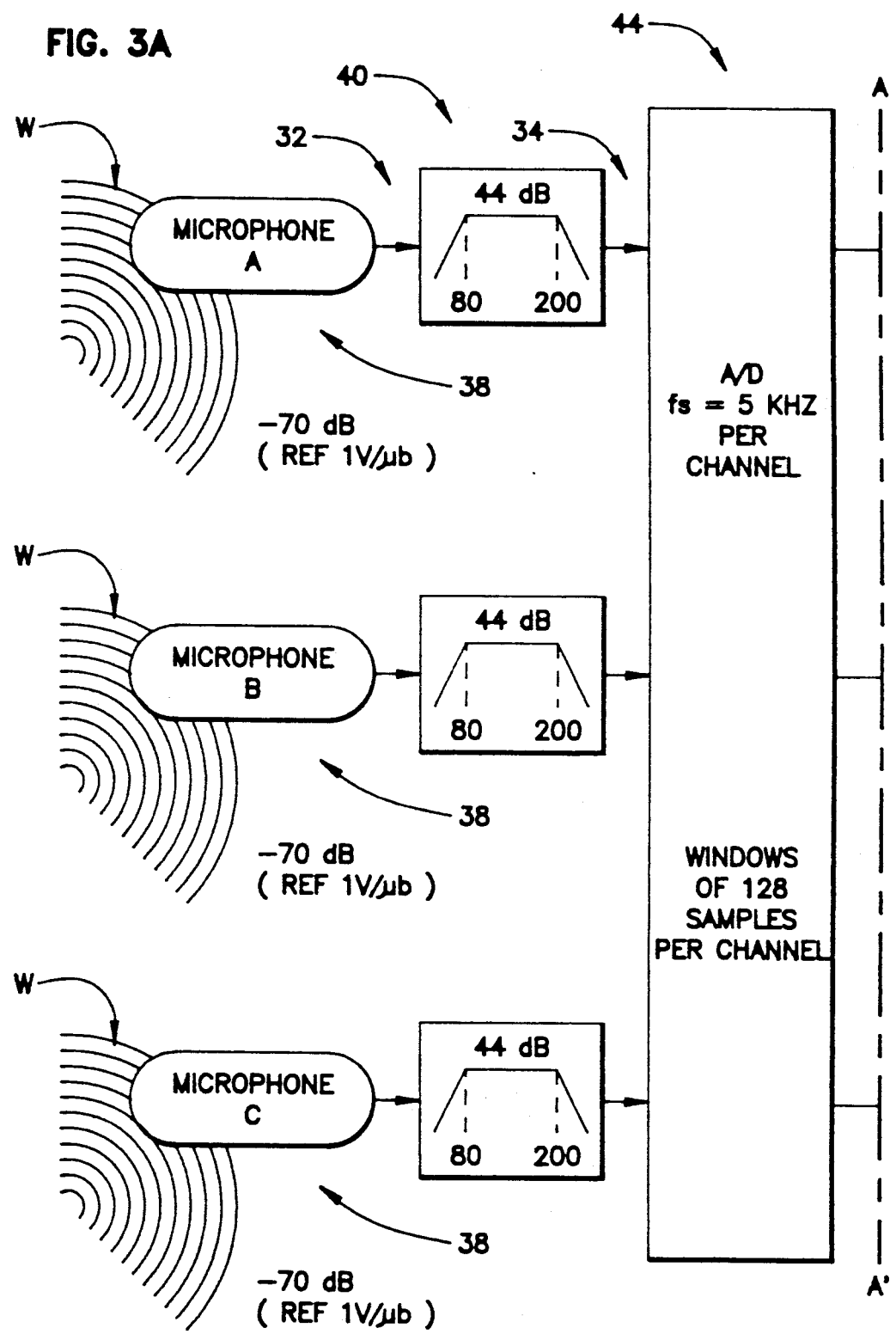

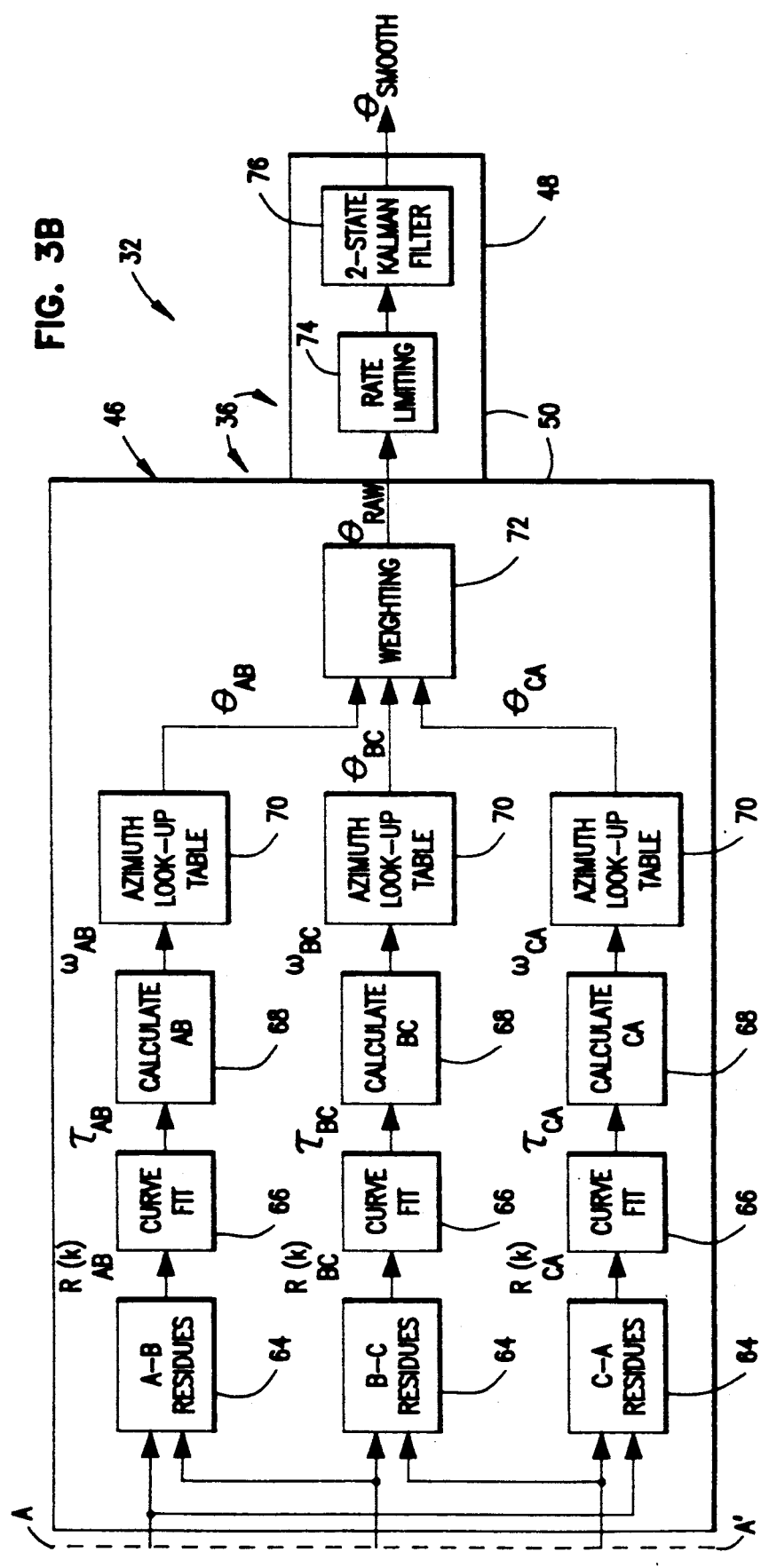

TARGET ENGAGEMENT SYSTEM FOR DETERMINING PROXIMITY TO A TARGET

RIGHTS OF THE GOVERNMENT

The Government has rights in this invention pursuant to Contract No. DAAA21-87-C-0201, awarded by the Department of the Army.

CROSS REFERENCE TO RELATED APPLICATION

Reference is hereby made to the following copending U.S. patent application dealing with related subject matter and assigned to the assignee of the present invention: "Target Tracking System For Determining Bearing Of A Target", assigned U.S. Ser. No. 07/582,581 and filed Sept. 14, 1990.

BACKGROUND OF THE INVENTION

1. Field of the Invention

The present invention generally relates to target tracking and engagement techniques for achieving accurate launching of a submunition and, more particularly, is concerned with a target engagement system for determining the range of a moving ground object.

2. Description of the Prior Art

A wide area mine (WAM) submunition is currently being developed for the U.S. military. The WAM (also termed a "smart" mine) submunition basically includes a noise sensor that can detect sounds, or an acoustic signature, of a moving target, a launcher tube containing a sublet, a positioning mechanism for aiming the launcher tube, and an arming and firing mechanism for launching the sublet from the launcher tube.

The WAM submunition is initially deployed in a target area in a laid down position on the ground. A self-righting mechanism of the WAM submunition is used to erect the launcher tube from the laid down position to an upright position prior to final arming. After erecting the launcher tube, the self-righting mechanism stabilizes the submunition in the upright position while maintaining it coupled with the ground. The positioning mechanism then aims the launcher tube toward the target so that the sublet when fired will be launched over the target.

For the sublet to be successfully launched over the target, tracking and engagement techniques must be available that are capable of determining the bearing to the sensed target and range of the target in the first place so that proper aiming of the launcher tube and launching of the sublet can be achieved. To be effective such tracking and engagement techniques must demonstrate a high degree of accuracy, have sufficient range and be capable of operating in a wide variety of environmental and site conditions.

Current range containment techniques contain spectral analysis and/or training which requires significant processing power. Some range containment techniques have limited ranges. Consequently, a need remains for improvements in engagement techniques for determining the range of a ground target in order to make a correct decision as to whether or not to launch a submunition toward the target.

SUMMARY OF THE INVENTION

The present invention provides a target engagement system designed to satisfy the aforementioned needs. The target engagement system uses target motion analysis to determine a target engagement decision for ground targets, such as vehicles. The input to the engagement system is the target azimuth as a function of time. A detect algorithm issues and records a detect azimuth when confirmation is made that a valid target is being tracked and legitimate azimuth information is being provided. The engagement algorithm then begins and records the time intervals it takes for the target to cross two sectors, each covering 20° and separate by 10°. Thus, first time interval is measured from detect azimuth to 20° after detect azimuth, and the second time interval is measured from 30° after detect azimuth to 50° after detect azimuth. When the first and second time intervals have been recorded, the ratio of the first time interval to the second time interval is calculated. If this ratio is greater than 2.0, then the target is estimated to be within range and is subsequently attacked. Otherwise, the target is greater than the range and no action is taken.

These and other features and advantages of the present invention will become more apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3A is a general block diagram of a hardware portion of the target tracking system of the cross-referenced invention.

FIG. 3B is a general flow diagram of a software portion of the target tracking system of of the cross-referenced invention.

DETAILED DESCRIPTION OF THE INVENTION

Sublet Launching Operations

Figure 1:
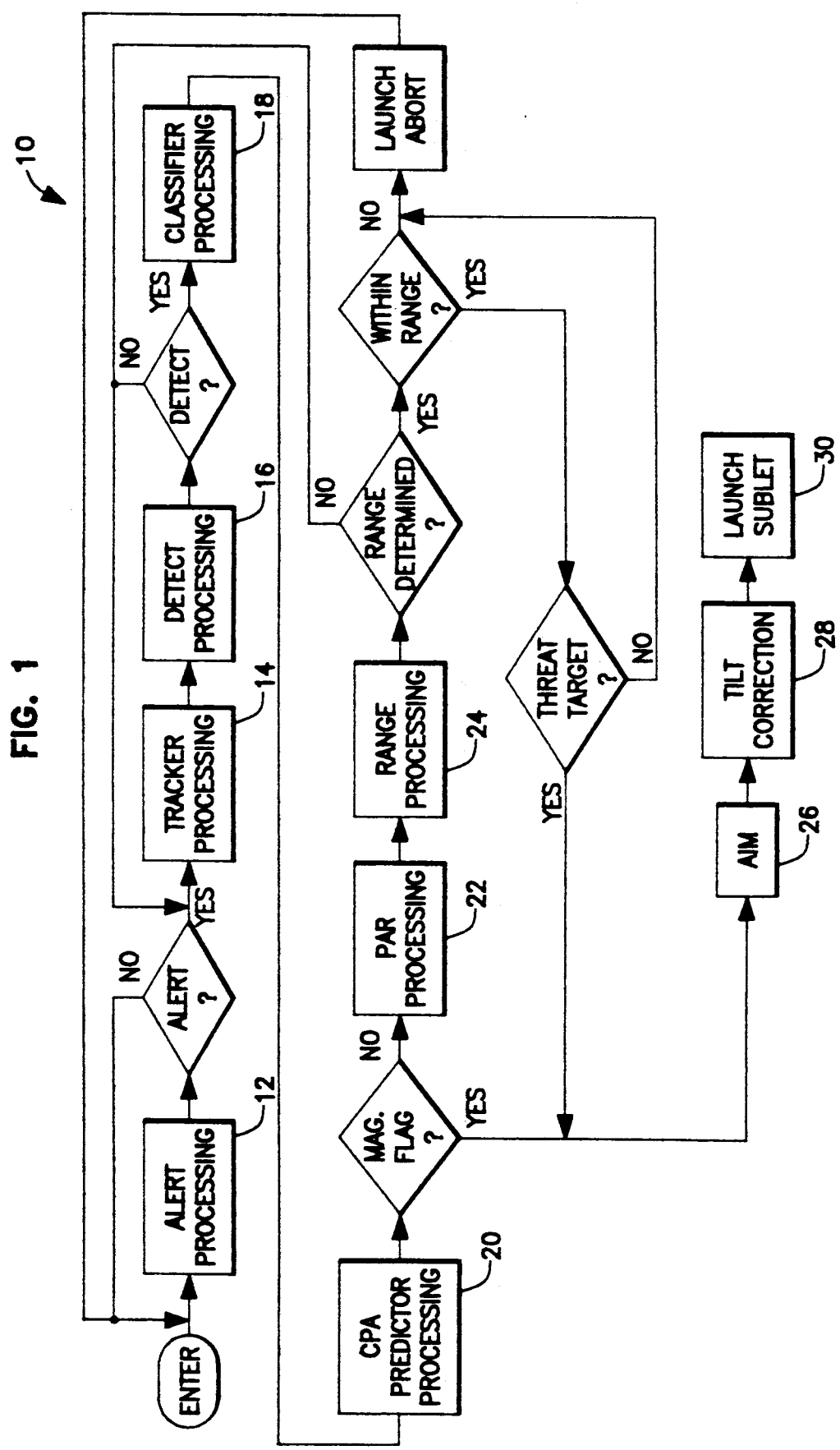
FIG. 1 is a flow diagram of the steps leading up to launching a sublet of a WAM submunition at a target, with the steps including a target tracking system of the cross-referenced invention and a target engagement system of the present invention.

Referring now to the drawings, and particularly to FIG. 1, there is illustrated a flow diagram 10 of the operations leading up to launching a sublet of a WAM submunition at a target. A target tracking system of the cross-referenced invention and a target engagement system of the present invention are parts of the operations of flow diagram 10.

Referring to the flow diagram 10 of FIG. 1, to initiate the operations leading to launching the sublet, a target T (FIG. 2) emitting an acoustic wave W (FIG. 2) must first be sensed, as represented by block 12, when the sensors are in an alert status. Next, tracking of the target T to determine its azimuth is performed, as represented by block 14, in accordance with the target tracking system of the cross-referenced invention.

The confirmation that a valid target is being tracked and legitimate azimuth information is being processed is provided by detecting and classifying algorithms, as represented by blocks 16 and 18. Processing by a closest point of approach (CPA) predictor and passive acoustic ranger (PAR), as represented by blocks 20 and 22, precede initiation of range processing, as represented by block 24, being the subject of the present invention. The range of the detected target leads to a decision to either authorize the initiation of launch or to abort launch. Initiation of launch begins with aiming of the sublet at the target, as represented by block 26, correcting the sublet for tilt if resting on an incline, as represented by block 28, and finally launching of the sublet, as represented by block 30.

Target Tracking System

Figure 2:
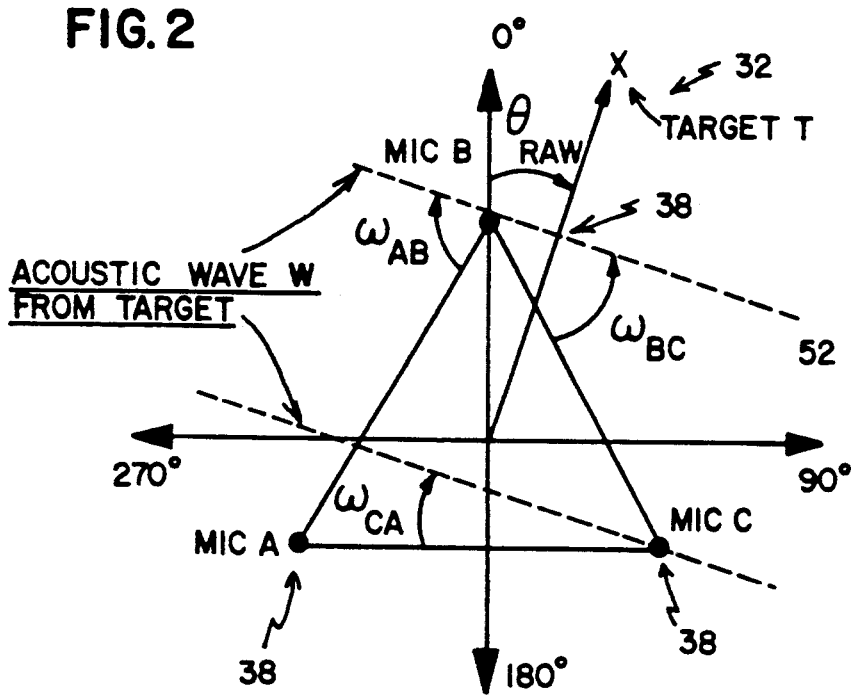
FIG. 2 is a diagram of the geometry of a three microphone array employed by the target tracking system of the cross-referenced invention.

Referring to FIGS. 2, 3A and 3B, there is illustrated the target tracking system 32 of the cross-referenced invention. The target tracking system 32 basically includes a hardware portion 34 which includes the components of FIGS. 3A and 4 and a software portion 36 which includes the components of FIGS. 3B, 5, 6, 7A and 7B, and 8A and 8B. The hardware portion 34 employs means 38 for sensing acoustic energy and generating analog signals, means 40 for conditioning the analog signals, means 42 for sampling the signals and means 44 for converting the analog signals to digital signals. The digital signals are then processed by the software portion 36 in accordance with the steps of a sequence of minimum residual correlation and two-state kalman filter software algorithms 46 and 48 stored and executed by a digital computer 50 to determine the bearing or azimuth to the target T, such as a ground vehicle, emitting the sensed acoustic energy.

Referring to FIGS. 2 and 3A, the sensing means 38 is a array 52 of acoustic transducers in the form of three microphones A, B and C arranged at corners of an equilateral triangle. The three-microphone array 52 intercepts the acoustic energy wave W emitted from the target T. The three-microphone array 52 is operable for sensing the acoustic energy wave W and generating analog signals representative of the acoustic energy sensed.

The processing carried out by the sequence of algorithms of the software portion 36 of the target tracking system 32 is passive and based on the time difference of arrival at the three different microphones A, B and C of the received acoustic wave emanating from the target T. Since the acoustic wave appears planar at the three microphones A, B and C, the bearing or azimuth to the target T can be determined trigonometrically from the time differences if they are accurately measured.

Hardware Portion of Target Tracking System

Figure 4:
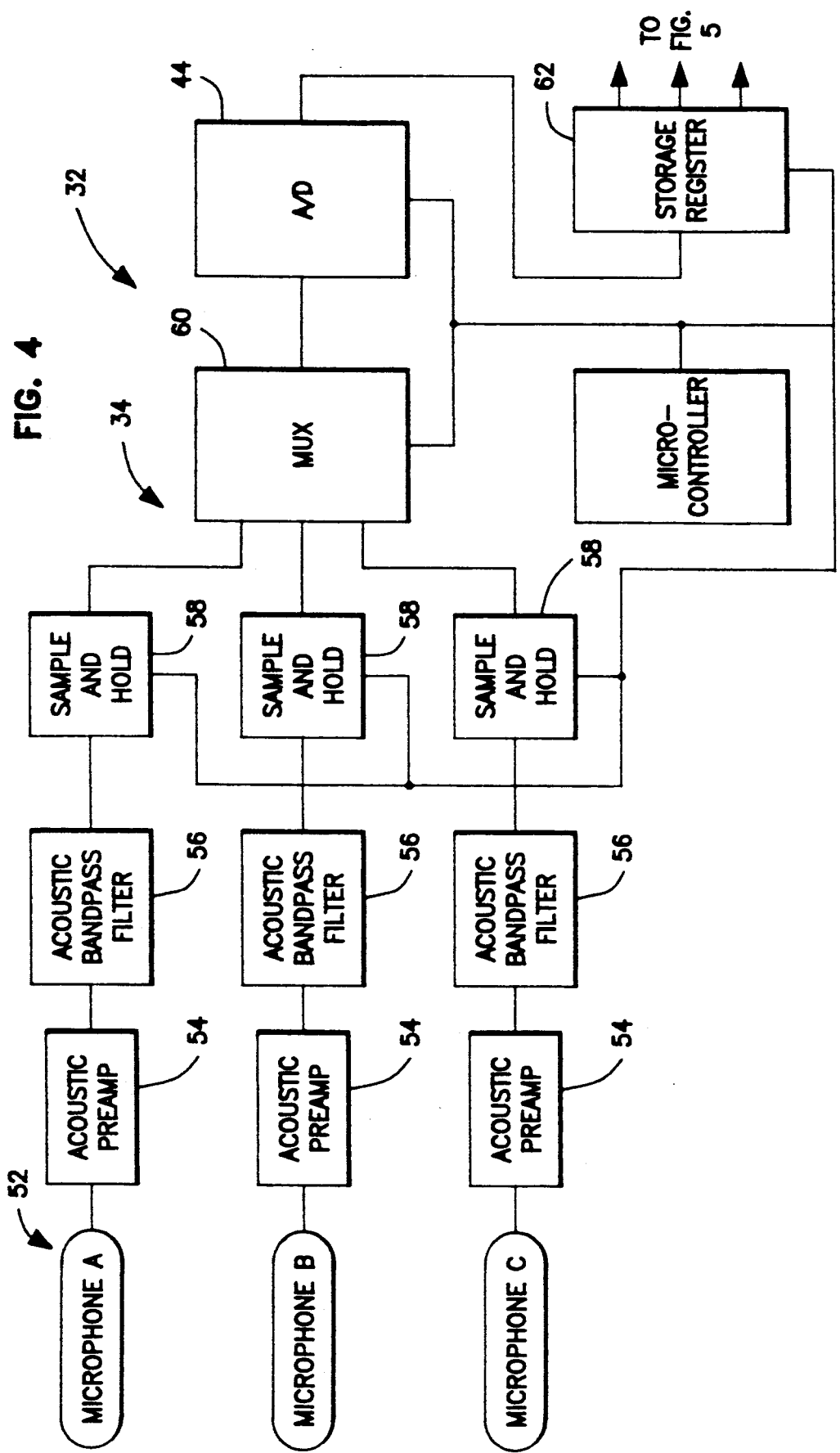
FIG. 4 is a detailed block diagram of the hardware portion of the target tracking system of FIG. 3.

Referring to FIGS. 3A and 4, after the microphones A, B and C of the sensing means 38 have transformed the acoustic wave to analog signals, the analog signals are first conditioned by the conditioning means 40 of the hardware portion 34 of the target tracking system 32. Preferably, the conditioning means 40 is composed of a serial arrangement of an acoustic preamplifier 54 and a bandpass filter 56 connected between each of the microphone A, B and C and one of a plurality of sample-and-hold units 58 of the sampling means 42. The sample-and-hold units 58 are connected to the converting means 44 which includes an analog-to-digital (A-to-D) converter unit 44. The conditioning means 40, sampling means 42 and converting means 44 are made up of components which are individually well-known to persons of ordinary skill in the art and thus need only be shown in block form. To illustrate these components in detail would not contribute to a better understanding of the cross-referenced invention but instead would only make the explanation of the cross-referenced invention more complex.

Each microphone analog output is simultaneously amplified and bandpass filtered (80-200 Hz) by the respective preamplifier 54 and bandpass filter 56. The microphone output is then sampled at 5 KHz by the sample-and-hold units 58 and windows of a preselected number of samples, such as 128, from each microphone A, B and C are formed and sequentially and repetitively transferred to the A-to-D converter unit 44 by a multiplexer 60 interposed between the outputs from the sample-and-hold units 58 and the inputs of the A-to-D converter unit 44. The digital output of the converter unit 44 is transmitted to a storage register 62 and therefrom to the digital computer 46.

Processing of the digital signals for determining the bearing to the ground object emitting the sensed acoustic energy is then carried out by the software portion 36 of the target tracking system 32. As mentioned previously, the software portion 36 comprises a sequence of minimum residual correlation and two-state kalman filter software algorithms 46, 48 stored and executed by the digital computer 50. By way of example, the digital computer 50 can be commercial equipment identified as a TMS320C25 Digital Signal Processor for storing and executing the minimum residual correlation algorithm 46 and a 68020 32-bit processor for storing and executing the two-state kalman filter algorithm 48.

Software Portion of Target Tracking System

Figure 5:
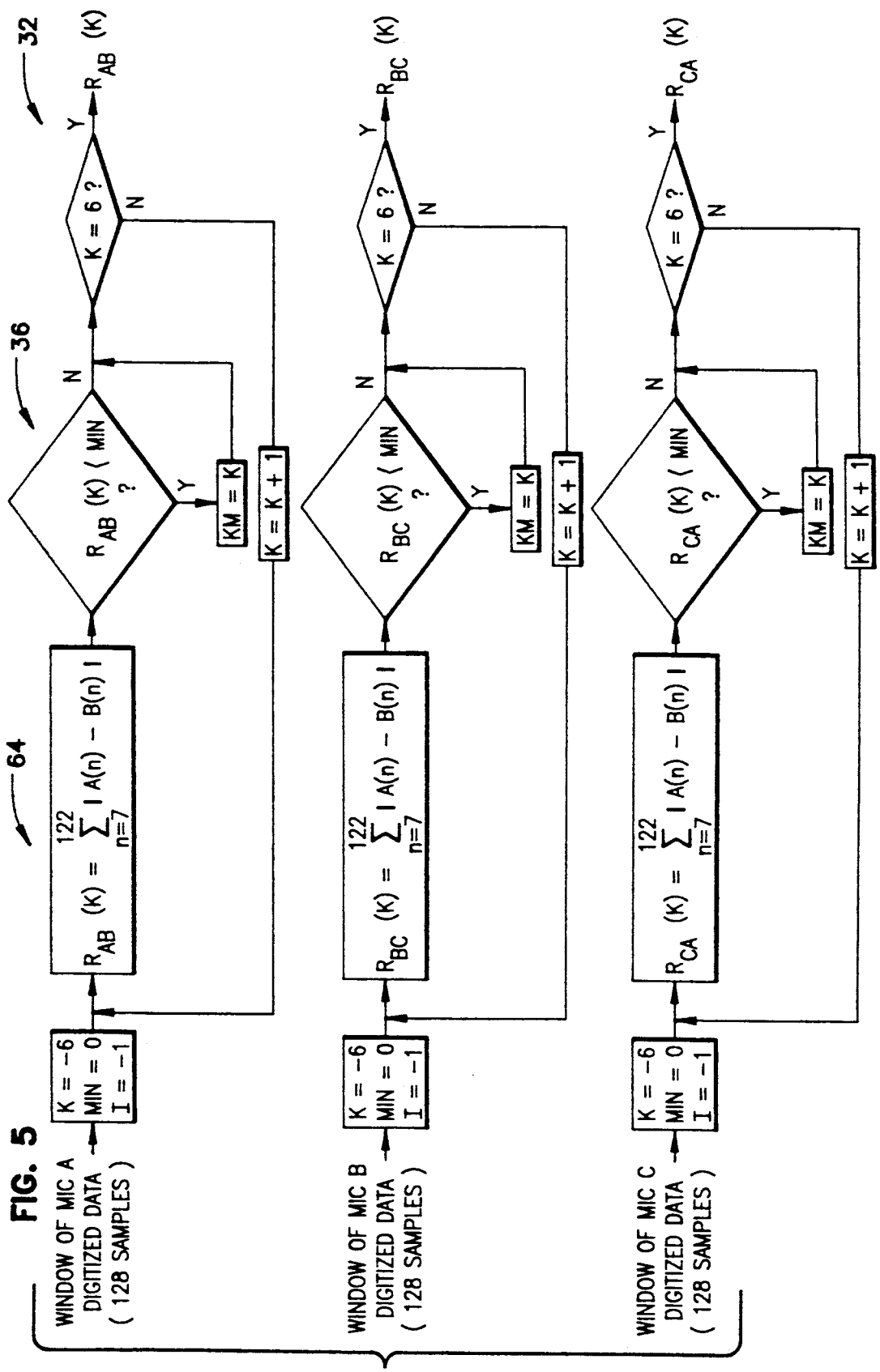
FIGS. 5 is a detailed flow diagram of a residue calculation section of a minimum residual correlation algorithm of the software portion of the tracking system of FIG. 3B.
Figure 6:
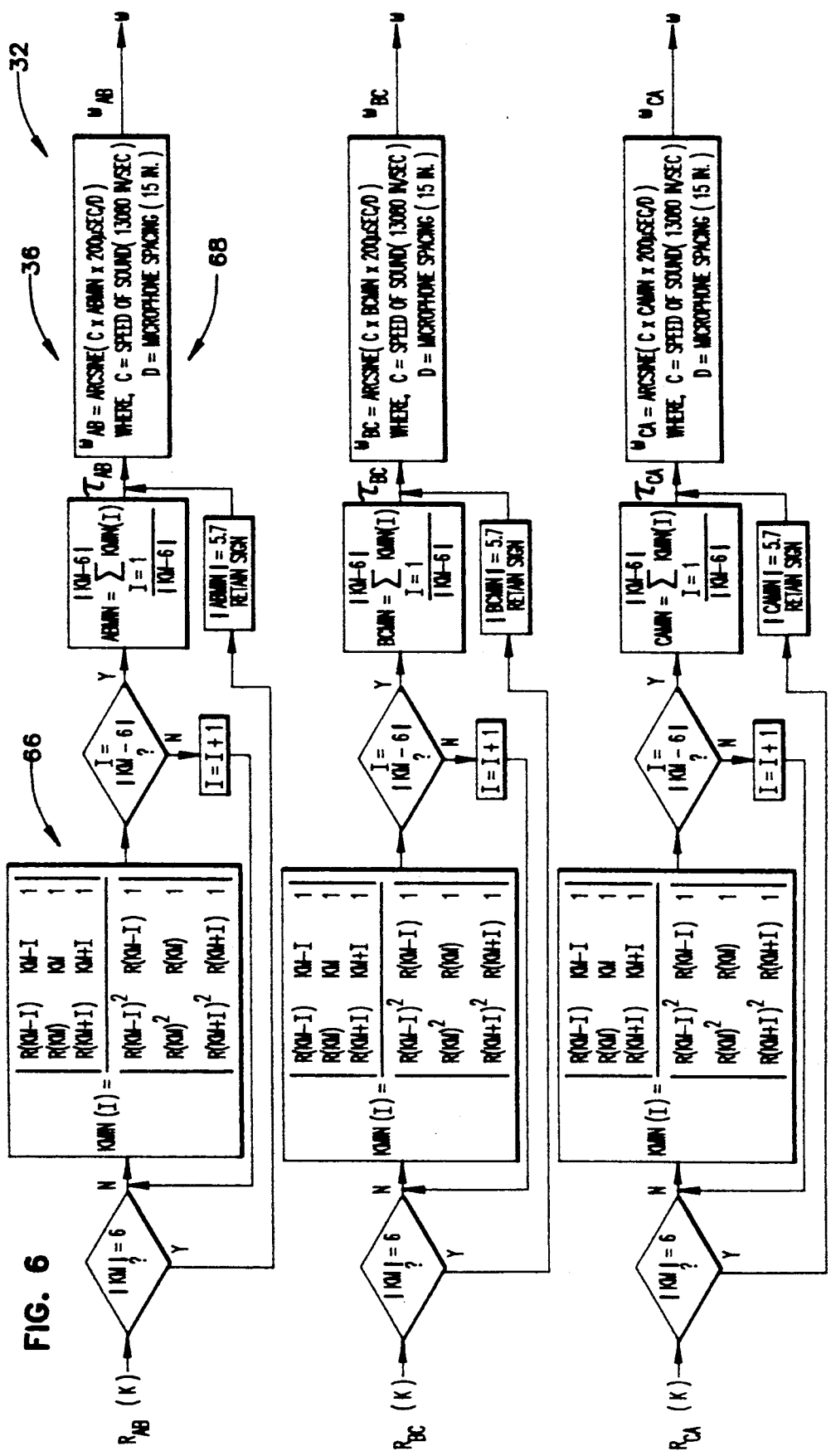
FIG. 6 is a detailed flow diagram of a curve fit and angle calculation section of the minimum residual correlation algorithm of the software portion of the tracking system of FIG. 3B.
Figure 7A:
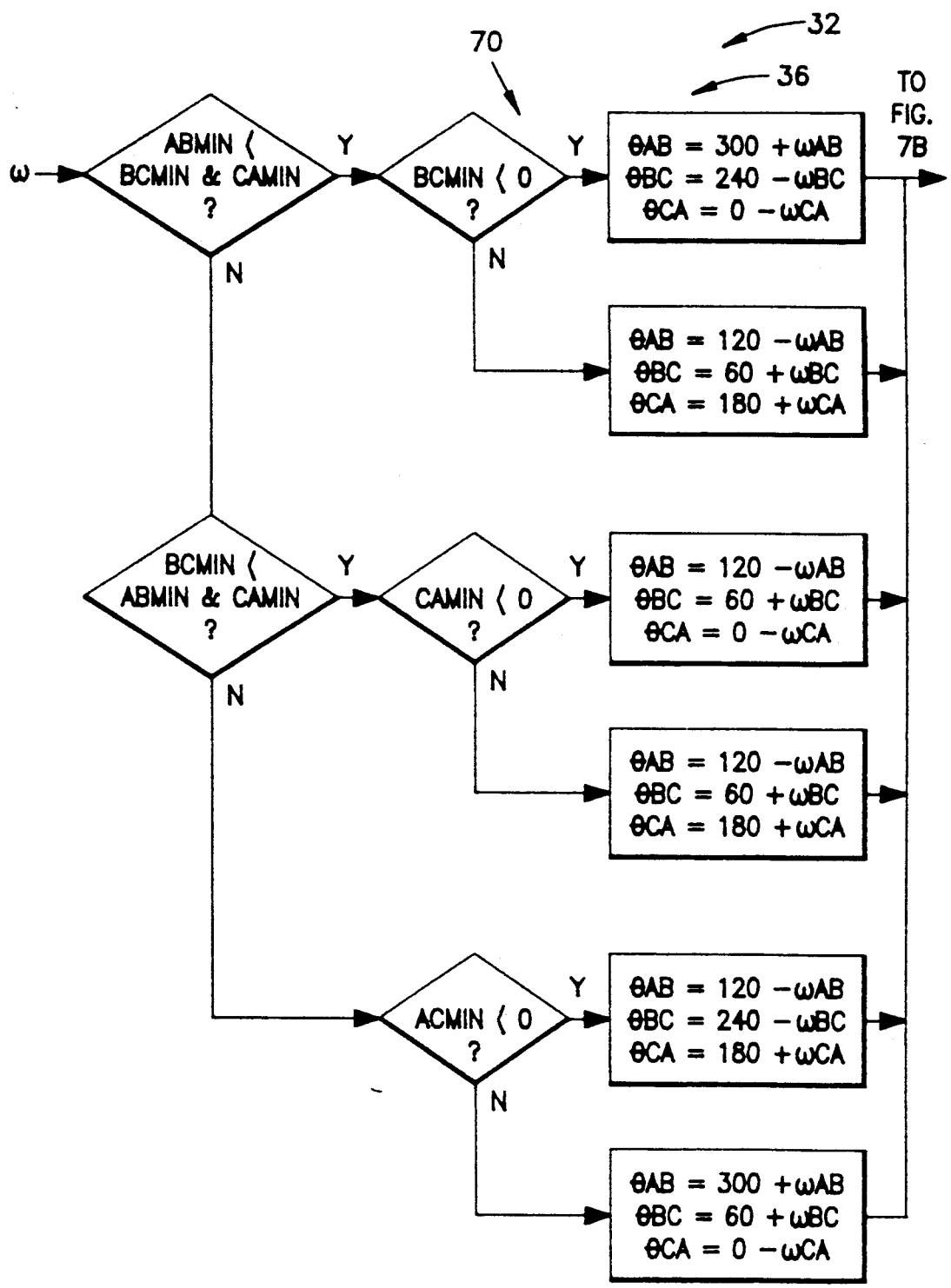
FIGS. 7A and 7B taken together are a detailed flow diagram of a look-up table and cosine weighting section of the minimum residual correlation algorithm of the software portion of the tracking system of FIG. 3B.
Figure 7B:
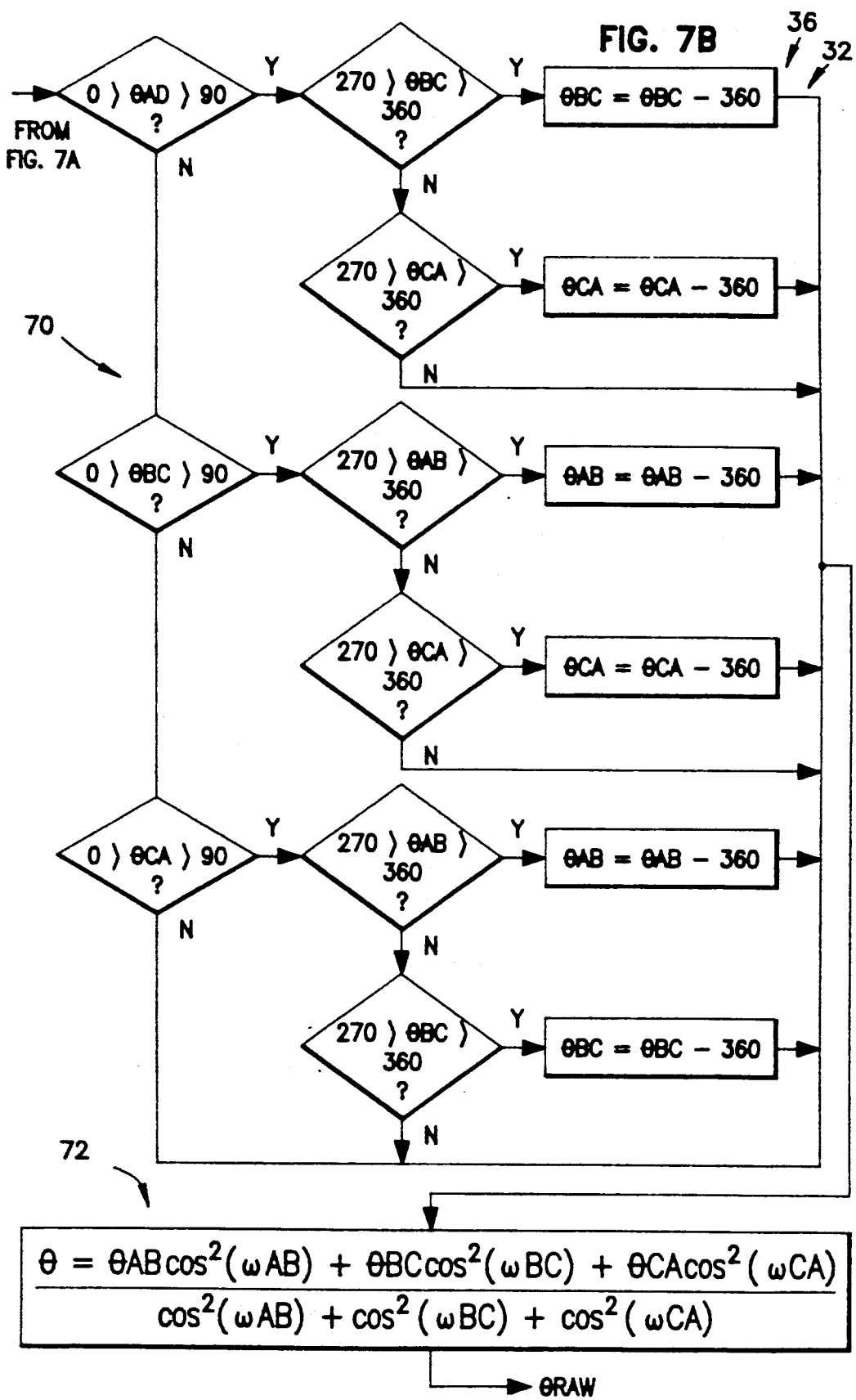

Referring to FIGS. 3B, 5, 6, 7A and 7B, there is illustrated respectively general and detailed flow diagrams of the minimum residual correlation software algorithm 46 of the target tracking system 32. FIGS. 3B and 5 depict a residue calculation section 64 of the minimum residual correlation algorithm 46. FIGS. 3B and 6 depicts a curve fit section 66 and angle calculation section 68 of the minimum residual correlation algorithm 46. FIGS. 3B, 7A and 7B depict a look-up table section 70 and cosine weighting section 72 of the minimum residual correlation algorithm 46.

The determination of target bearing or azimuth from acoustic signals is possible because of the physical properties of sound waves. An acoustic wave W emanating from a point source on a target T (such as a tank) several meters from the submunition to be launched can be assumed to be approximately planar. Because sound travels a fixed distance per unit time, an acoustic signal detected by two of three microphones arranged in an equilateral triangle are required to determined azimuth from 0° to 360°. As seen in FIG. 2, the planar acoustic wave W is traversing a three-microphone array 52. The angle between the acoustic wave W and the axis of any two microphones is the incidence angle ($\omega_{AB}$, $\omega_{BC}$, $\omega_{CA}$) Azimuth ($\theta_{raw}$) is measured from the center of the equilateral triangle and is perpendicular to the planar wave W. Each microphone pair (A,B; B,C; and C,A) has a unique acoustic delay related to target azimuth. The minimum residual correlation algorith 46 estimates the delay for each microphone pair and calculates the corresponding target azimuth.

Referring to the residue calculation section 64 of the minimum residual correlation algorithm 46 of FIG. 3B, for each of the three pairs of microphones A,B; B,C; and C,A, residues $R_{AB}(k)$, $R_{BC}(k)$, and $R_{CA}(k)$ are calculated from the windowed data samples received from the hardware portion 34 of the target tracking system 32. These residues are calculated in accordance with the steps of the algorithm illustrated in detail in FIG. 5 and described in detail in the software listing contained in the attached Appendix.

Referring to the curve fit section 66 and angle calculation section 68 of the minimum residual correlation algorithm 46 of FIG. 3B, for each of the residues $R_{AB}(k)$, $R_{BC}(k)$ and $R_{CA}(k)$ corresponding to each of the three pairs of microphones A,B; B,C; and C,A, a multiple parabolic curve fit is performed to each of the residues to arrive at delay estimates, $\tau_{AB}$, $\tau_{BC}$ and $\tau_{CA}$, for each pair. From each of the three delay estimates, angles of incidence, $\omega_{AB}$, $\omega_{BC}$, $\omega_{CA}$, are calculated for each of the three pairs of microphones. The delay estimates and angles of incidence are calculated in accordance with the steps of the algorithm illustrated in detail in FIG. 6 and described in detail in the software listing contained in the attached Appendix.

Referring to the look-up table section 70 and cosine weighting section 72 of the minimum residual correlation algorithm 46 of FIG. 3B, each angle of incidence, $\omega_{AB}$, $\omega_{BC}$, $\omega_{CA}$, is converted into a corresponding azimuth estimate, $\theta_{AB}$, $\theta_{BC}$, $\theta_{CA}$, for each of the three pairs of microphones by accessing a look-up table stored in memory. The table is based on a division of the azimuth coordinate system into twelve 30° sectors, with microphone B in the direction of 0°. The table lists conversion equations which permit converting from an angle of incidence ($\omega$) to azimuth ($\theta$) for each microphone pair. The signs of all three delay values, the minimum, are required to resolve the correct azimuth estimate. This arises from the fact that for each angle of incidence, two azimuth estimates are possible. Thus, a corresponding azimuth estimate is derived from the look-up table for each microphone pair depending on the sector location of the target.

In the cosine weighting section 72, the three azimuth estimates are averaged to provide one final azimuth estimate (raw azimuth). Each estimate is weighted by a corresponding sensitivity function, which is the cosine squared of the angle of incidence for the respective microphone pair. The azimuth estimates for each microphone pair and the cosine weighting of the estimates are calculated in accordance with the steps of the algorithm illustrated in detail in FIGS. 7A and 7B and described in detail in the software listing contained in the attached Appendix.

In summary, in the minimum residual correlation algorithm 46, the time difference or delay ($\tau$) of acoustic wave front arrival for each microphone pair is determined by the residue correlation of the windowed data and curve fitting, the time delay for each microphone pair is translated to target bearing ($\theta$) through a trigonometric formula and look-up table, and each bearing estimate from the three pairs of microphones are cosine weighted together to arrive at one raw bearing estimate ($\theta_{raw}$). A new estimate is available ever 15.6 milliseconds (40 Hz. update rate). Thus, the output of the minimum residual correlation software algorithm 46 of the target tracking system 32 is the raw azimuth ($\theta_{raw}$) estimate.

Figure 8A:
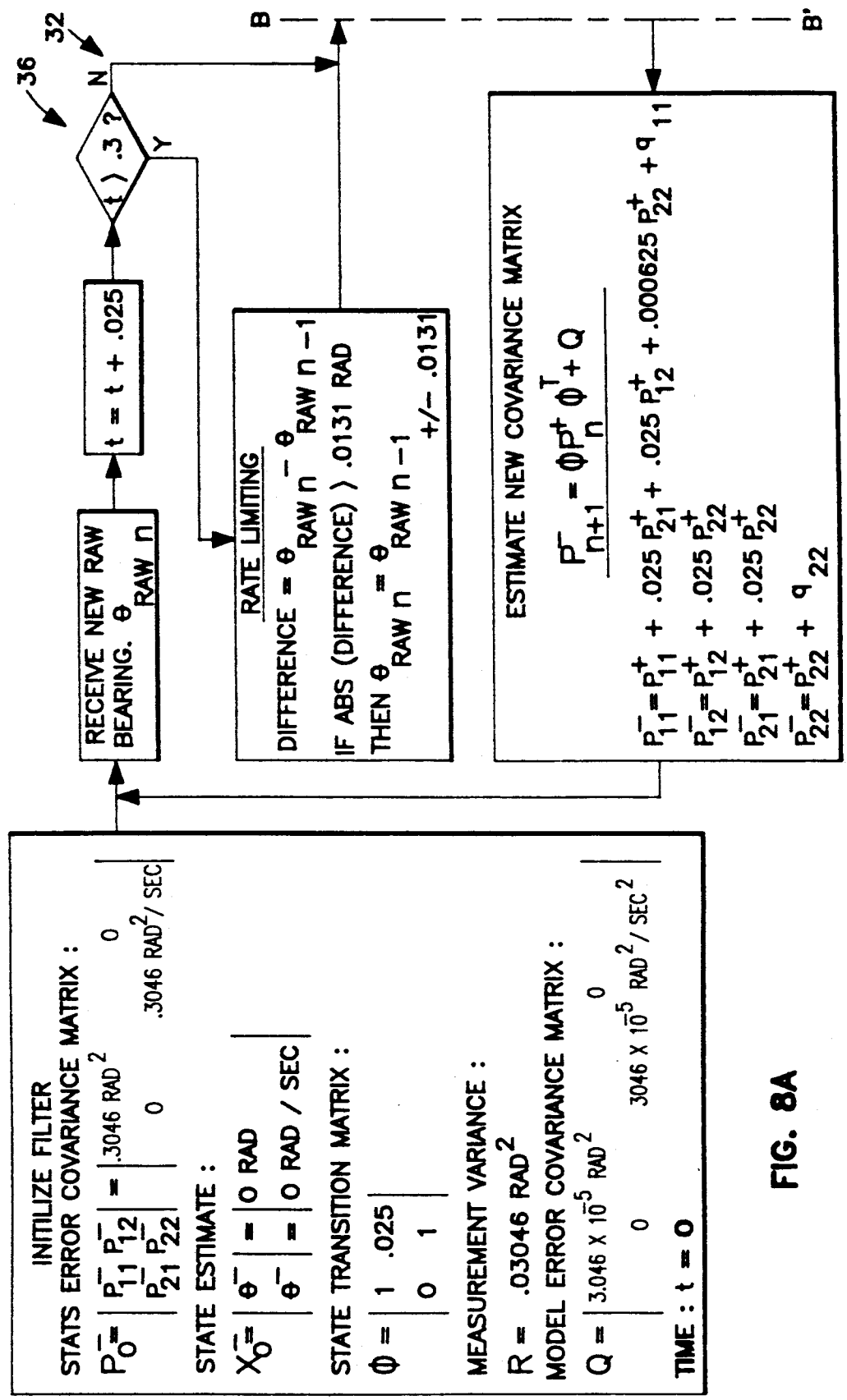
FIGS. 8A and 8B taken together are a detailed flow diagram of a two-state kalman filter algorithm of the software portion of the tracking system of FIG. 3B.
Figure 8B:
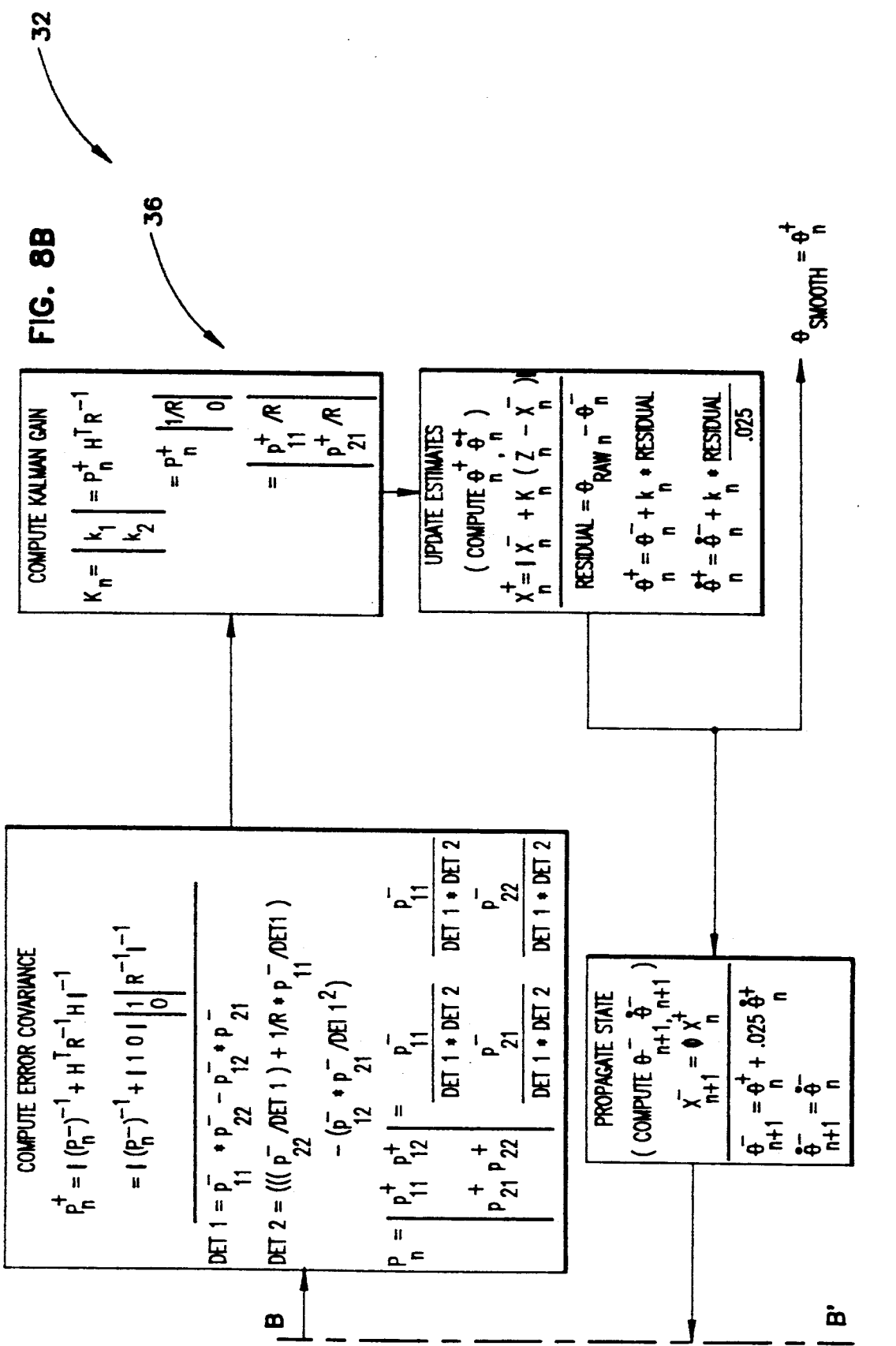

Referring to FIGS. 3B, 8A and 8B, there is illustrated respective general and detailed flow diagrams of the two-state kalman filter software algorithm 48 of the target tracking system 32. At the two-state kalman filter algorithm 48, the raw bearing estimate is filtered or smoothed through the use of rate limiting as per block 74 of FIG. 3B and a two-state linear kalman filter as per block 76 of FIG. 3B to arrive at the final output, a smoothed estimate of the bearing or azimuth of the target. The kalman filter generates an azimuth rate estimate along with the smoothed azimuth. A constant azimuth rate model, characteristic of an alpha-beta filter, is used. However, kalman gains are computed at each iteration to provide the optimum filtering for all phases of the trajectory, from initial convergence through steady state tracking.

The rate limiting and two-state linear kalman filter operations represented by blocks 74 and 76 of FIG. 3B are carried out in accordance with the steps of the two-state kalman filter software algorithm 48 illustrated in detail in FIGS. 8A and 8B and described in detail in the software listing contained in the attached Appendix.

The advantages of the target tracking system 32 are as follows: (1) it operates passively to provide target bearing; (2) it does not require "line of sight" to the target; (3) it operates in a wide variety of environmental and site conditions, unaffected by grass, trees, shrubbery or hills; (4) it has long range capability up to 750 meters for heavy tracked vehicles; (5) it has ten degree (1 sigma) accuracy; and (6) it inherently tracks the largest and closest vehicle in multiple vehicle situations.

Previous methods of passive acoustic tracking have used smaller microphone arrays and all analog processing. Tracking range was limited to less than 100 meters and tracking errors were much greater than with this digital tracking system. Other digital techniques including cross-correlation or beam-forming require more processing capability in the system and/or very large array sizes in order to achieve the same accuracy and range.

Target Engagement System

Figure 9:
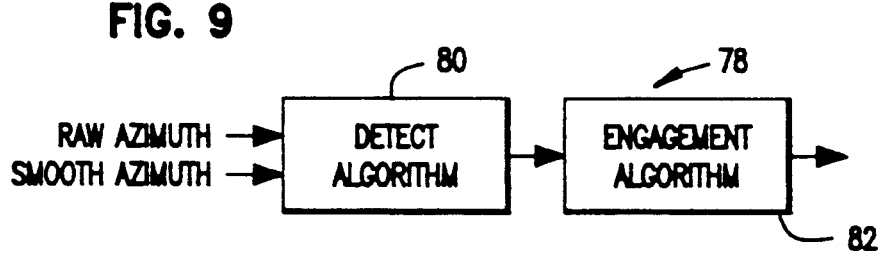
FIG. 9 is a general block diagram of a target engagement algorithm constituting the invention of the present invention.
Figure 10:
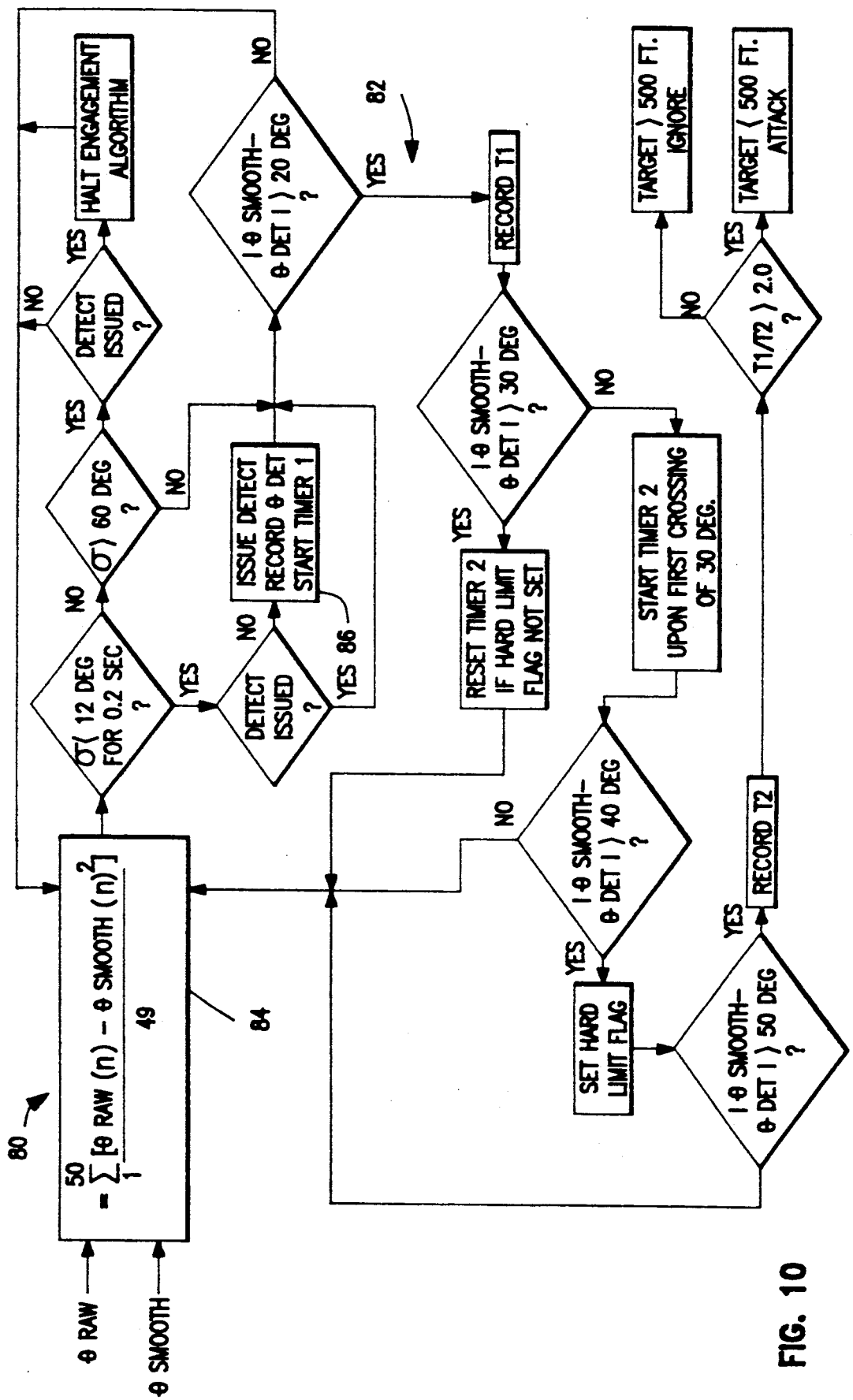
FIG. 10 is a detailed flow diagram of the target engagement algorithm of FIG. 9.

Referring to FIGS. 9 and 10, there is illustrated a target engagement system 78 constituting the present invention. The target engagement system 78 is implemented in software and includes a detect algorithm 80 and an engagement (delta-theta ratio test) algorithm 82. The target engagement system 78 uses target motion analysis to determine a target engagement decision for ground targets, such as vehicles. The input to the system 78 is the target azimuth as a function of time. It analyzes target azimuth information without requiring target speed, heading, or range. Azimuth information is described herein as being provided from the target tracking system 32 of the present invention described above. Alternatively, such information can be provided by some other suitable system. In other words, use of the target engagement system 78 is not dependent upon use of the target tracking system 32.

Once the algorithms of the target tracking system 32 have been initiated, a detect must be issued at block 84 of the detect algorithm 80 to begin the sequence of the target engagement system 78. The detect algorithm 80 provides confirmation that a valid target is being tracked and legitimate azimuth information is being provided. This is accomplished by computing the standard deviation of the raw azimuth relative to the smooth azimuth. Thus, the detect algorithm 80 requires both raw and smooth azimuth readings as inputs, as seen in FIG. 9. The raw and smooth azimuth updates are generated by the target tracking system 32 of FIGS. 3A and 3B.

The standard deviation of the raw azimuth relative to the smooth azimuth is calculated as per block 84. Once the standard deviation decreases below 12° for 0.2 second, a detect is issued, initiating the engagement sequence. Typically, the standard deviation decreases when the raw azimuth estimate locks onto the target. However, during the engagement sequence, the detect is canceled and the operation of the engagement system 78 is halted, if at any subsequent time the standard deviation increases above 60° during any update.

Once a detect is issued by the detect algorithm 80 as a result of the calculation and testing of the standard deviation at block 84, the corresponding detect azimuth is recorded as per block 86 and the engagement algorithm 82 begins. The engagement algorithm 82 records the times (T1 and T2) it takes for the target to cross two sectors, each covering 20° and separate by 10°. The first sector covers 20° from a reference line corresponding to the detect azimuth. The second sector covers another 20° but is displaced from 30° to 50° relative to the reference line. Thus, time T1 is measured from detect (the reference line) to 20° after detect azimuth, and time T2 is measured from 30° after detect azimuth (the reference line) to 50° after detect azimuth.

The starting boundaries of the first and second sectors and the ending boundary of the first sector will reset the corresponding timer (T1 and T2) if crossed by the current azimuth estimate. This tends to average out noisy azimuth updates. The starting boundary of second sector is hard-limited from resetting T2 if the azimuth estimate has changed by greater than 40° from detect azimuth. The time measurements end when the azimuth estimate first crosses the end of the second sector.

When T1 and T2 have been recorded the ratio of T1/T2 is calculated. If this ratio is greater than 2.0, then the target is estimated to be within approximately 500 feet and is subsequently attacked. Otherwise, the target is greater than 500 feet away and no action is taken.

The standard deviation of raw and smooth azimuth and the ratio of times (T1 and T2) ar calculated in accordance with the steps of the algorithms of the system 78 illustrated in detail in the detailed flow diagram of FIG. 10 and described in detail in the software listing contained in the attached Appendix.

The advantages of the target engagement system 78 are as follows: (1) it operates passively to provide target range containment; (2) it requires minimal processing, extensive spectral analysis not being used; (3) it is independent of target speed; (4) it does not require "line of sight" to the target; (5) it operates well in a wide variety of environmental conditions; (6) it automatically gives priority to heavy targets (i.e., a tank); (7) only target azimuth is required, the exact range not being used; (8) it determines engagement for extended ranges, such as greater than 500 feet; and (9) the target heading or closest point of approach is not required.

The range containment approach of the engagement system 78 uses azimuth updates from the target tracking system 32 of the present invention which uses acoustics as the influence. Other passive range containment approaches use other influences such as seismics or magnetics. Both of these approaches provide range containment for targets relatively close to the sensor. Other passive acoustic approaches contain extensive spectral analysis and/or training which requires significant processing power.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

For purposes of satisfying description, enablement and best mode requirements, a computer program listing entitled "Wide Area Mine (WAM) Software" is included in the Appendix hereto. This computer program is contained in the memory of the computers which directs the performance of the steps of the various algorithms discussed herein and depicted in the flow diagrams of FIGS. 3B, 5, 6, 7A, 7B, 8A, 8B, 9 and 10. Particularly, the minimum residual correlation and two-state kalman filter algorithms 46 and 48 of the target tracking system 32 are contained within the listings named RESDUE and TRACKER contained on pages A-1 to A-12. The detect and engagement algorithms 80 and 82 of the target engagement system 78 are contained within the listing named LAUNCH CONTROL contained on pages A-13 to A-31.

APPENDIX

Wide Area Mine (WAM) SOFTWARE LISTING

RESDUE.ASM

Description: THIS MODULE WILL COMPUTE 13 RESIDUES FOR EACH MICROPHONE PAIR FROM THE DIGITIZED MICROPHONE SIGNALS. TO COMPUTE THE 13 RESIDUES FOR EACH PAIR, USE THE EQUATION:

$$\sum_{N=7}^{122} |A(N) - B(N-K)| \, , \, -6 < K < +6$$

```
        IDT     'RESDUE'

DEF     RESDUE

REF     PMICA,PMICB,PMICC
        REF     PRESAB,PRESBC,PRESCA

* MEMORY ALLOCATIONS ARE;
*   MICA - 0300-037F (BLOCK B1, 128 WORDS)
*   MICB - 0380-03FF (BLOCK B1, 128 WORDS)
*   MICC - 0200-027F (BLOCK B0, 128 WORDS)

ARSTR2  EQU     >60             AUX REG STORE 2
ARSTR1  EQU     >61             AUX REG STORE 1
TEMPL   EQU     >62
TEMPH   EQU     >63
K       EQU     12

PSEG    $

RESDUE  SSXM                    SET SIGN EXTENSION
        LRLK    AR1,PMICA+6     PTR FOR MIC A DATA
        LRLK    AR2,PMICB+12    PTR FOR MIC B DATA
        LRLK    AR3,PRESAB      PTR FOR RESIDUE AB
        SXF                     REQUEST GLOBAL BUS
NEXTAB  CALL    CAL,*,AR1       CALCULATE 13 RESIDUES FOR AB

* ALL THE RESISUES FOR MICROPHONE A-B HAVE BEEN CALCULATED
* USE THE SAME PROCEDURE TO CALCUALTE RESIDUES FOR MIC BC.

LRLK    AR1,PMICB+6     PTR FOR MIC B
        LRLK    AR2,PMICC+12    PTR FOR MIC C
        LRLK    AR3,PRESBC      PTR FOR RESIDUE BC
NEXTBC  CALL    CAL,*,AR1       CALCULATE 13 RESIDUES FOR BC

* ALL THE RESIDUES FOR MIC PAIRS A-B, B-C ARE CALCULATED.
* USE THE SAME PROCEDURE TO CALCUALTE RESIDUES FOR MIC CA.

LRLK    AR1,PMICC+6     PTR FOR MIC C
        LRLK    AR2,PMICA+12    PTR FOR MIC A
        LRLK    AR3,PRESCA      PTR FOR RESIDUE CA
```

```
NEXTCA   CALL    CAL,*,AR1    CALCULATE 13 RESIDUES FOR CA
         RXF                  RELEASE GLOBAL BUS
         RSXM                 RESET SIGN EXTENSION
         RET                  RETURN TO EXEC

* THIS SUBROUTINE WILL CALCULATE THE RESIDUE FOR THE
* GENERIC MICROPHONE PAIR A(N) AND B(N-K).
* AUX REG 1 HAS THE POINTER FOR A(N).
* AUX REG 2 HAS THE POINTER FOR B(N).
* THE RESULT IS STORED AT PRESxx.
* IT TAKES 1742 CYCLES TO CALCULATE ONE RESIDUE

CAL      LARK    AR4,K        K = 0 to 12
         SAR     AR1,ARSTR1   SAVE PMICx+6
CALC     LARK    AR0,115      LOAD WITH N=122-7
         LAR     AR1,ARSTR1   RELOAD AR1 WITH PMICx+6
         ZAC                  CLEAR ACC
         SAR     AR2,ARSTR2   SAVE PMICB
         SACL    TEMPL        CLEAR TEMPL
         SACH    TEMPH        CLEAR TEMPH
CALC1    LAC     *+,0,AR2     ADD A(N)
         SUB     *+,0,AR0     A(N) - B(N-K) --> ACC
         ABS                  |A(N) - B(N-K)| --> ACC
         ADDS    TEMPL        ADD TEMPL TO ACCL
         ADDH    TEMPH        ADD TEMPH TO ACCH
         SACL    TEMPL
         SACH    TEMPH        STORE THE TEMP VALUE
         BANZ    CALC1,*-,AR1 BR BACK IF NOT 115 TIMES

LARP    AR3          POINT AT PRESxx
         SACH    *+           STORE ACCH TO PRESxxH
         SACL    *+,0,AR2     STORE ACCL TO PRESxxL
         LAR     AR2,ARSTR2   RESTORE POINTER TO MICx(N-K)
         MAR     *-,AR4       DEC PMICx,ARP = AR2 FROM SUB
         BANZ    CALC,*-,AR1  IF NOT 13TH RESIDUE,DO AGAIN
         RET

PEND
         END
```

*TRACKER PACKAGE SPECIFICATION*

------------------------------------------------------------------------
------------------------------------------------------------------------

```
with WAM_Types;    use WAM_Types;

package Tracker is procedure Start_Trackers;
   -- This procedure starts the tracker system by initializing the 2-State
   -- Kalman filter.

procedure Tracker_Executive( Raw_Residues       : in  RESIDUES;
                                Raw_Bearing        : in out REAL;
                                Acoustic_Detection : in  BOOLEAN;
                                Time2              : in  REAL;

Smooth_Bearing     : out REAL;
                                Bearing_Rate       : out REAL );
   -- This procedure performs the acoustic bearing algorithm based on the
   -- acoustic residues from each microphone pair.  The raw bearing result
```

```
   -- is then filtered with a 2-State Kalman filter which returns a smoothed
   -- bearing and bearing rate.

end Tracker;
```

---
---

TRACKER PACKAGE BODY

---
---

```ada
with FCP_Errors;     use FCP_Errors;
with WAM_Tools;      use WAM_Tools;

with Trig;           use Trig;
with Math_Constants; use Math_Constants;
with Constants;      use Constants;

package body Tracker is
```

---

```ada
-- types type ARRAY_2 is ARRAY ( 1..2 ) of REAL;

type MATRIX_2X2 is ARRAY ( 1..2 ) of ARRAY_2;

-- A, B, C, array of REAL values
   type MIC_ARRAY is array ( 1 .. 3 ) of REAL;

-- AB, BC, CA, array of REAL values
   type MIC_PAIRS_ARRAY is array ( 1 .. 3 ) of REAL;

-- AB, BC, CA, array of INTEGER values
   type MIC_PAIRS_INT_ARRAY is array ( 1 .. 3 ) of INTEGER;

-- constants

Dt : constant REAL := 0.025; -- time between samples (1/40 sec.)

-- declarations

-- 2 State Kalman Filter Declarations
   q2          : ARRAY_2;     -- Driving noise
   kf2         : ARRAY_2;     -- Kalman filter gains
   x2          : ARRAY_2;     -- State matrix
   p2          : MATRIX_2X2;  -- Covariance matrix
   work2       : MATRIX_2X2;  -- Temporary working matrix
   New_Sample2 : REAL;        -- New raw bearing sample
   Old_Sample2 : REAL;        -- Previous raw bearing sample
```

```
Determinant2 : REAL; -- Determinant of covariance matrix
Residual2    : REAL; -- Residual value
Mic_Pairs_Bearing : MIC_PAIRS_ARRAY;

----------------------------------------------------------------------- procedure Compute_Min_Residue_Index( Residue_Window : in RESIDUES;
                                Min_Res_Index : in out MIC_PAIRS_INT_ARRAY ) is begin
   for i in 1 .. 3 loop
      Min_Res_Index(i) := -6;
      for j in Residue_Window(i)'First+1 .. Residue_Window(i)'Last loop
         if Residue_Window(i)(j) < Residue_Window(i)(Min_Res_Index(i)) then
            Min_Res_Index(i) := j;
         end if;
      end loop;
   end loop;
exception   -- Catch exceptions
   when others =>

-- Set error for later transmission to the STS.
      FCP_Errors.Set( UNKNOWN_ERROR, TRACKER_PKG, 1 );
end Compute_Min_Residue_Index;

-----------------------------------------------------------------------

-- COMPUTE LAG TIME.  Calculates the actual lag time using
-- a 3 point parabolic curve fitting technique.

procedure Compute_Lag_Time( Residue_Window   : in  RESIDUES;
                               Min_Res_Index_in : in  MIC_PAIRS_INT_ARRAY;
                               Lag_Time         : in out MIC_PAIRS_ARRAY ) is X1,X2,X3,Count : INTEGER;
   Y1,Y2,Y3,Num,Den,Sum : REAL;

begin for p in 1 .. 3 loop
      -- Check if at either end of array (i.e. 6 or -6)
      if Min_Res_Index_In(p) = 6 then
         Lag_Time(p) := 5.7;
      elsif Min_Res_Index_In(p) = -6 then
         Lag_Time(p) := -5.7;

-- Perform parabolic curve fitting until at either end of array.
      else
         x1 := Min_Res_Index_In(p) - 1;
         x2 := Min_Res_Index_In(p);
         x3 := Min_Res_Index_In(p) + 1;
         Sum := 0.0;
         Count := 0;
         while (x1 >= -6) and (x3 <= 6) loop y1 := REAL(Residue_Window(p)(x1));
            y2 := REAL(Residue_Window(p)(x2));
            y3 := REAL(Residue_Window(p)(x3));

Num := (REAL(x1) ** 2) * (y2 - y3) -
                   (REAL(x2) ** 2) * (y1 - y3) +
                   (REAL(x3) ** 2) * (y1 - y2);
```

```
        Den := y1 * REAL(x2 - x3) -
               y2 * REAL(x1 - x3) +
               y3 * REAL(x1 - x2);

Sum := Sum + (-Num / (2.0 * Den));
        Count := Count + 1;

x1 := x1 - 1;
        x3 := x3 + 1;

end loop;
    -- Done curve fitting, calculate and limit Lag_Time
    Lag_Time(p):= Sum / (REAL(Count));
    if Lag_Time(p) < -5.7 then
        Lag_Time(p) := -5.7;
        elsif Lag_Time(p) > 5.7 then
            Lag_Time(p) := 5.7;
        end if;
    end if;
end loop;

exception  -- Catch exceptions
    when others =>
        -- Set error for later transmission to the STS.
        FCP_Errors.Set( UNKNOWN_ERROR, TRACKER_PKG, 2 );
end Compute_Lag_Time;
```

---

-- COMPUTE INCIDENCE ANG. This procedure computes the angle of incidence for
-- each microphone pair (A-B, B-C, C-A) based on their associated lag time.

```
procedure Compute_Incidence_Ang( Lag_Time     : in out MIC_PAIRS_ARRAY ;
                                 Incidence_Ang : out    MIC_PAIRS_ARRAY ) is Speed_of_Sound : constant REAL := 13080.0;  -- 13080 inches/sec.
Mic_Spacing    : constant REAL := 15.0;     -- 15 inches begin
    for i in 1 .. 3 loop   -- loop for 3 microphone pairs
        -- Scale Lag_Time(i) from 1_lag_time=200us to 1_lag_time=1 second
        Lag_Time(i) := Lag_Time(i) * 0.000200;
        Incidence_Ang(i) := Asin(Speed_of_Sound * Lag_time(i) / Mic_Spacing);
    end loop;
exception  -- Catch exceptions
    when others =>
        -- Set error for later transmission to the STS.
        FCP_Errors.Set( UNKNOWN_ERROR, TRACKER_PKG, 3 );
end Compute_Incidence_Ang;
```

---

-- COMPUTE BEARING. This procedure computes the target bearing for each of the
-- microphone pairs (A-B, B-C, C-A) based on their associated angle of incidence
-- and lag time.

```
procedure Compute_Bearing( Incidence_Ang : in     MIC_PAIRS_ARRAY ;
                           Lag_Time      : in     MIC_PAIRS_ARRAY ;
                           Bearing       : in out MIC_PAIRS_ARRAY ) is C300_Degs : constant REAL := 300.0*DTR;
C240_Degs : constant REAL := 240.0*DTR;
C180_Degs : constant REAL := 180.0*DTR;
```

```
C120_Degs : constant REAL := 120.0*DTR;
C60_Degs  : constant REAL := 60.0*DTR;

begin
   if abs(Lag_Time(1)) < abs(Lag_Time(2)) then
      if abs(Lag_Time(1)) < abs(Lag_Time(3)) then
         -- Lag_Time_AB is minimum, make sure BC and CA are different signs.
         -- If BC and CA are same sign, don't update Bearings AB,BC,CA.
         if Lag_Time(2) < 0.0 and Lag_Time(3) > 0.0 then
            Bearing(1) := C300_Degs + Incidence_Ang(1);
            Bearing(2) := C240_Degs - Incidence_Ang(2);
            Bearing(3) := -Incidence_Ang(3);
         elsif Lag_Time(2) > 0.0 and Lag_Time(3) < 0.0 then
            Bearing(1) := C120_Degs - Incidence_Ang(1);
            Bearing(2) := C60_Degs + Incidence_Ang(2);
            Bearing(3) := C180_Degs + Incidence_Ang(3);
         end if;
      -- Lag_Time_CA is minimum, make sure AB and BC are different signs.
      -- If AB and BC are same sign, don't update Bearings AB,BC,CA.
      elsif Lag_Time(1) < 0.0 and Lag_Time(2) > 0.0 then
         Bearing(1) := C120_Degs - Incidence_Ang(1);
         Bearing(2) := C240_Degs - Incidence_Ang(2);
         Bearing(3) := C180_Degs + Incidence_Ang(3);
      elsif Lag_Time(1) > 0.0 and Lag_Time(2) < 0.0 then
         Bearing(1) := C300_Degs + Incidence_Ang(1);
         Bearing(2) := C60_Degs + Incidence_Ang(2);
         Bearing(3) := -Incidence_Ang(3);
      end if;
   elsif abs(Lag_Time(2)) < abs(Lag_Time(3)) then
      -- Lag_Time_BC is minimum, make sure AB and CA are different signs.
      -- If AB and CA are same sign, don't update Bearings AB,BC,CA.
      if Lag_Time(3) < 0.0 and Lag_Time(1) > 0.0 then
         Bearing(1) := C120_Degs - Incidence_Ang(1);
         Bearing(2) := C60_Degs + Incidence_Ang(2);
         Bearing(3) := -Incidence_Ang(3);
      elsif Lag_Time(3) > 0.0 and Lag_Time(1) < 0.0 then
         Bearing(1) := C300_Degs + Incidence_Ang(1);
         Bearing(2) := C240_Degs - Incidence_Ang(2);
         Bearing(3) := C180_Degs + Incidence_Ang(3);
      end if;
   -- Lag_Time_CA is minimum, make sure AB and BC are different signs.
   -- If AB and BC are same sign, don't update Bearings AB,BC,CA.
   elsif Lag_Time(1) < 0.0 and Lag_Time(2) > 0.0 then
      Bearing(1) := C120_Degs - Incidence_Ang(1);
      Bearing(2) := C240_Degs - Incidence_Ang(2);
      Bearing(3) := C180_Degs + Incidence_Ang(3);
   elsif Lag_Time(1) > 0.0 and Lag_Time(2) < 0.0 then
      Bearing(1) := C300_Degs + Incidence_Ang(1);
      Bearing(2) := C60_Degs + Incidence_Ang(2);
      Bearing(3) := -Incidence_Ang(3);
   end if;
exception  -- Catch exceptions
   when others =>
      -- Set error for later transmission to the STS.
      FCP_Errors.Set( UNKNOWN_ERROR, TRACKER_PKG, 4 );
end Compute_Bearing;
```

---

```
procedure Handle_Discontinuity( Bearing : in out MIC_PAIRS_ARRAY ) is

In_First_Quadrant : BOOLEAN := FALSE;
```

```
begin
   for i in 1 .. 3 loop
      while Bearing(i) < 0.0 loop
         Bearing(i) := Bearing(i) + 2.0*pi;
      end loop;
      if Bearing(i) < pi/2.0 then
         In_First_Quadrant := TRUE;
      end if;
   end loop;
   if In_First_Quadrant then
      for i in 1 .. 3 loop
         while Bearing(i) > pi loop
            Bearing(i) := Bearing(i) - 2.0*pi;
         end loop;
      end loop;
   end if;

exception   -- Catch exceptions
   when others =>
      -- Set error for later transmission to the STS.
      FCP_Errors.Set( UNKNOWN_ERROR, TRACKER_PKG, 5 );
end Handle_Discontinuity;
```

---

```
-- COS WEIGHTING.  This procedure calculates a weighted bearing estimate based
-- on both the angle of incidence and the bearing estimate from each of the
-- three microphone pairs (A-B, B-C, C-A).

procedure Cos_Weighting( Bearing          : in MIC_PAIRS_ARRAY ;
                         Incidence_Angle  : in MIC_PAIRS_ARRAY ;
                         Weighted_Bearing : out REAL ) is Cos_Sq_AB, Cos_Sq_BC, Cos_Sq_CA : REAL;

begin

--
   Cos_Sq_AB := Cos( Incidence_Angle(1) ) ** 2;
   Cos_Sq_BC := Cos( Incidence_Angle(2) ) ** 2;
   Cos_Sq_CA := Cos( Incidence_Angle(3) ) ** 2;

Weighted_Bearing := ( Bearing(1) * Cos_Sq_AB +
                         Bearing(2) * Cos_Sq_BC +
                         Bearing(3) * Cos_Sq_CA )
                       / ( Cos_Sq_AB + Cos_Sq_BC + Cos_Sq_CA );

exception   -- Catch exceptions
   when others =>
      -- Set error for later transmission to the STS.
      FCP_Errors.Set( UNKNOWN_ERROR, TRACKER_PKG, 6 );
end Cos_Weighting;
```

---

```
- ACOUSTIC BEARING.  This is the main procedure for the acoustic bearing
- algorithm.  The input to this routine is three 128 element arrays of filtered
-- acoustic data which originated from the 3 microphones.  The minimum residues,
-- lag times, angles of incidence, the bearings for each microphone, and
-- finally the single cosine weighted bearing are all calculated during the
-- call to this routine.

procedure Process_Acoustic_Bearing( Raw_Residues : in  RESIDUES;
                                    Raw_Bearing  : out REAL ) is
```

```
   Min_Res_Index   : MIC_PAIRS_INT_ARRAY := (others=>0);
   Lag_Time        : MIC_PAIRS_ARRAY := (others=>0.0);
   Incidence_Ang   : MIC_PAIRS_ARRAY := (others=>0.0);

begin
   Compute_Min_Residue_Index( Raw_Residues , Min_Res_Index );
   Compute_Lag_Time( Raw_Residues, Min_Res_Index , Lag_Time );
   Compute_Incidence_Ang( Lag_Time , Incidence_Ang );
   Compute_Bearing( Incidence_Ang , Lag_Time , Mic_Pairs_Bearing );
   Handle_Discontinuity( Mic_Pairs_Bearing );
   Cos_Weighting( Mic_Pairs_Bearing , Incidence_Ang ,\Raw_Bearing );
exception   -- Catch exceptions
   when others =>
      -- Set error for later transmission to the STS.
      FCP_Errors.Set( UNKNOWN_ERROR, TRACKER_PKG, 7 );
end Process_Acoustic_Bearing;
```

---

```
-- INITIALIZE 2 STATE. This procedure initializes the Two State Alpha-Beta
-- tracker. This will be called prior to the start of each target tracking
-- run.

procedure Initialize_2_State is
begin
   -- Init covariance matrix
   p2(1)(1) := 1000.0 * ( DTR * DTR );
   p2(1)(2) := 0.0;
   p2(2)(2) := 1000.0 * ( DTR * DTR );
   p2(2)(1) := 0.0;
   -- Init state matrix
   x2(1) := 0.0;
   x2(2) := 0.0;
   -- Init driving noise input
   q2(1):= 0.1 * ( DTR * DTR );
   q2(2):= 0.1 * ( DTR * DTR );
   -- Init old sample from previous run
   Old_Sample2 := 0.0;

exception   -- Catch exceptions
   when others =>
      -- Set error for later transmission to the STS.
      FCP_Errors.Set( UNKNOWN_ERROR, TRACKER_PKG, 8 );
end Initialize_2_State;
```

---

```
-- START TRACKERS. This procedure starts the tracker system by initializing
-- the 2-State Kalman filter (and someday maybe the three).
procedure Start_Trackers is
begin -- Initialize 2-state Kalman Filter.
   Initialize_2_State;

-- Initialize bearing AB, BC, and CA in case of invalid residues
   -- at the start of each run.
   Mic_Pairs_Bearing(1):= 0.0;
   Mic_Pairs_Bearing(2):= 0.0;
   Mic_Pairs_Bearing(3):= 0.0;

exception   -- Catch exceptions
   when others =>
```

```
      -- Set error for later transmission to the STS.
         FCP_Errors.Set( UNKNOWN_ERROR, TRACKER_PKG, 9 );
end Start_Trackers;
```

---

```
-- LIMIT CHANGE.  This routine limits the rate of change of the smoothed
-- bearing to +- 30 degrees per secound.

procedure Limit_Change( New_Sample : in out REAL;
                           Old_Sample : in     REAL) is Pos_Limit : constant REAL := PI/6.0;  --   (30 deg) maximum change per sec.
   Neg_Limit : constant REAL := -PI/6.0;
   Difference : REAL;

begin
      Difference := New_Sample - Old_Sample;

-- Adjust if passing thru +- 180 degrees.
      While Difference > Pi loop
         Difference := Difference - 2.0*Pi;
      end loop;
      While Difference < -Pi loop
         Difference := Difference + 2.0*Pi;
      end loop;

-- Limit rate
      if ((( Difference ) / dt ) > Pos_Limit ) then
         New_Sample := Old_Sample + dt * Pos_Limit;
      end if;
      if ((( Difference ) / dt ) < Neg_Limit ) then
         New_Sample := Old_Sample + dt * Neg_Limit;
      end if;

exception   -- Catch exceptions
      when others =>
         -- Set error for later transmission to the STS.
         FCP_Errors.Set( UNKNOWN_ERROR, TRACKER_PKG, 10 );
   end Limit_Change;
```

---

```
-- TWO STATE KALMAN.  This procedure performs one pass through the 2-State
-- Kalman Filter given the Raw_Bearing from the Tracker_Executive and returns
-- the smoothed Bearing and Bearing_Rate.

procedure Two_State_Kalman(  Raw_Bearing       : in out REAL;
                                Acoustic_Detection : in BOOLEAN;
                                Time2             : in REAL;
                                Smooth_Bearing    : out REAL;
                                Bearing_Rate      : out REAL ) is Sigma_noise : constant REAL := 10.0*DTR * 10.0*DTR;

begin
      New_Sample2 := Raw_Bearing;
      -- Convert to +- pi
      if New_Sample2 > pi then
         New_Sample2 := New_Sample2 - 2.0*pi;
      end if;
      if New_Sample2 < -pi then
         New_Sample2 := New_Sample2 + 2.0*pi;
      end if;
```

```
-- Impose rate limit on raw bearing after 3/10 second
if ( time2 > 0.3 ) then
    Limit_Change( New_Sample2, Old_Sample2 );
end if;
Old_Sample2 := New_Sample2;

-- Calculate the residual value ( x2(1) is smoothed bearing )
Residual2 := New_Sample2 - x2(1);
if Residual2 > pi then
    Residual2 := Residual2 - 2.0*pi;
end if;
if Residual2 < -pi then
    Residual2 := Residual2 + 2.0*pi;
end if;

-- Update covariance matrix
Determinant2 :=  p2(1)(1) * p2(2)(2) - p2(1)(2) * p2(2)(1);
Work2(1)(1)  := (p2(2)(2) / Determinant2 ) + ( 1.0/Sigma_noise );
Work2(1)(2)  := -p2(1)(2) / Determinant2;
Work2(2)(1)  := -p2(2)(1) / Determinant2;
Work2(2)(2)  :=  p2(1)(1) / Determinant2;
Determinant2 :=  Work2(1)(1) * Work2(2)(2) - Work2(1)(2) * Work2(2)(1);
p2(1)(1)     :=  Work2(2)(2) / Determinant2;
p2(1)(2)     := -Work2(1)(2) / Determinant2;
p2(2)(1)     := -Work2(2)(1) / Determinant2;
p2(2)(2)     :=  Work2(1)(1) / Determinant2;

-- Kalman gain calculation
kf2(1) := p2(1)(1) / Sigma_noise;
kf2(2) := p2(2)(1) / Sigma_noise;

-- Update state matrix
x2(1) := x2(1) + kf2(1) * Residual2;
x2(2) := x2(2) + kf2(2) * Residual ;

-- Propagate state ( x2(1) is Bearing, x2(2) is Slope of Bearing
x2(1) := x2(1) + dt*x2(2);

Smooth_Bearing := x2(1);
Bearing_Rate   := x2(2);

-- Noise is then propagated through the covariance matrix to
-- maintain the filter bandwidth.
p2(1)(1) := p2(1)(1) + 2.0*dt*p2(1)(2) + dt*dt*p2(2)(2) + q2(1);
p2(1)(2) := p2(1)(2) + dt*p2(2)(2);
p2(2)(1) := p2(1)(2);
p2(2)(2) := p2(2)(2) + q2(2);

exception  -- Catch exceptions
    when others =>
        -- Set error for later transmission to the STS.
        FCP_Errors.Set( UNKNOWN_ERROR, TRACKER_PKG, 11 );
end Two_State_Kalman;

------------------------------------------------------------------------- procedure Tracker_Executive( Raw_Residues     : in  RESIDUES;
                             Raw_Bearing      : in out REAL;
                             Acoustic_Detection : in  BOOLEAN;
                             Time2            : in  REAL;
                             Smooth_Bearing   : out REAL;
                             Bearing_Rate     : out REAL ) is
```

```ada
begin

-- Calculate new acoustic bearing
    Process_Acoustic_Bearing( Raw_Residues, Raw_Bearing );

-- Filter Bearing
    Two_State_Kalman( Raw_Bearing,
                      Acoustic_Detection,
                      Time2,
                      Smooth_Bearing,
                      Bearing_Rate );

exception  -- Catch exceptions
    when others =>
        -- Set error for later transmission to the STS.
        FCP_Errors.Set( UNKNOWN_ERROR, TRACKER_PKG, 12 );
end Tracker_Executive;

end Tracker;
```

LAUNCH CONTROL PACKAGE BODY

------------------------------------------------------------------------
------------------------------------------------------------------------

```ada
with FCP_Errors;      use FCP_Errors;
with Trig;            use Trig;
with Math_Constants;  use Math_Constants;
with Constants;       use Constants;
with Tracker;
with Classifier;
with Launcher_Iface;

package body Launch_Control is

-- Bearing as calculated by the Acoustic Bearing routine.
Raw_Bearing : REAL;

-- Kalman filtered bearing
Smooth_Bearing : REAL;

-- Kalman Bearing Rate
Bearing_Rate : REAL;

-- Bearing angle at the time that the decision to launch is made.
Launch_Decision_Angle : REAL;
-- Predicted Angle at which target will be 8 seconds after launch.
 redictive_Lead_Angle : REAL;

--
Target_Class : POSITIVE_8;

-- Azimuth Stop (1 - 12) for launch
Azimuth_Stop : POSITIVE_8;

-- Tilt (0-2) for launch
Tilt : POSITIVE_8;
```

```
    Launch_Ratio : REAL;

-- This is the basis for the decision to launch the sublet.  It's purpose
    -- is only for reporting to the STS.  The values are defined as follows:
    --           1 - Fixed Angle (Delta Theta) / Launch Ratio
    --           2 - Sound Pressure Level
    --           3 - Kalman Filter / CPA Prediction
    --           4 - Magnetic Alert
    --           5 - Anti Personnel
    --           6 - Launch Aborted
    Launch_Basis : POSITIVE_8;

-- Bearing rate at time of launch decision.
    Launch_Bearing_Rate : REAL;

-- Launch decision issued by this package.
    Launch_Decision_Made : BOOLEAN;

-- Flag to indicate magnetic alert time has been saved on first pass of alert.
    -- Magnetic_Alert_Time_Saved : BOOLEAN;
    -- Magnetic_Alert_Time : REAL;
    -- Magnetic_Alert_Bearing : REAL;

-- Target Detection flag
    Detection : BOOLEAN;

-- Bearing angle at time of detection
    Detect_Bearing : REAL;

-- Current run time at time of detection
    Detect_Time : REAL;

-- Flag to indicate that one target detection has occurred.
    Had_One_Detection : BOOLEAN;

-- Counter for 8 passes below threshold before turning detection on.
    Detection_Count : INTEGER_32 := 0;

-- Bearing angle at the time the SPL_target flag is set
    SPL_Bearing : REAL;

-- This flag is set if the average of the last 50 SPL samples exceeds limit
    SPL_Target : BOOLEAN := FALSE;
    -- SPL value (average of last 50 SPL samples)
     veraged_SPL : POSITIVE_16;

-- Fire sublet flag indicates the Sublet will be fired and causes the
    -- Fire message to be sent to the STS.
    Fire_Sublet : BOOLEAN := FALSE;

-- Raw Bearing Array Index (1 - 50)
    Bearing_Array_Index : INTEGER := 0;

-- Array of last 50 raw bearing samples for standard deviation calculation
    -- in the detection logic.
    Raw_Bearing_Array : array ( 1 .. 50 ) of REAL;
    -- Flag to indicate 50 bearing samples have been taken
    Had_Initial_Bearing_Samples : BOOLEAN := FALSE;

-- Flag to indicate 10 bearing rate samples have been taken
    Had_Initial_Rate_Samples    : BOOLEAN := FALSE;
    -- Running total of last 10 bearing rate samples.
```

```
Bearing_Rate_Total : REAL;
-- Array to hold last 10 bearing rate samples
Bearing_Rate_Array : array ( 1 .. 10 ) of REAL;
-- Index to Bearing_Rate_Array
Bearing_Rate_Array_Index : INTEGER := 0;

-- Time expired on current run. Updated at 40hz, divide by 40.0 to get seconds.
Time_Count : INTEGER_32;
-- Time expired on current run (in seconds).
Current_Run_Time : REAL;
-- Boolean flags for Launch mode 1 (fixed angle).
Finished_Angle1     : BOOLEAN := FALSE;
Finished_Angle2     : BOOLEAN := FALSE;
Inhibit_Sector2_Start_Time_Reset : BOOLEAN := FALSE;

-- Start and stop times for Launch mode 1 (fixed angle).
Sector1_Start_Time : REAL;
Sector1_End_Time   : REAL;
Sector2_Start_Time : REAL;
```
---

```
Launch_Ratio_Computed : BOOLEAN := FALSE;

dt : constant REAL := 1.0 / 40.0;   -- delta time (40HZ)

SPL_Threshold         : constant REAL := 3.644;   -- 65dB

Time_At_C             : REAL;
   -- Elapsed time with respect to the CPA estimation reference frame. This
   -- value is computed each iteration.

Bearing_At_C          : REAL;
   -- Target bearing with respect to the CPA estimation reference frame. This
   -- value is computed each iteration.

CPA_Flag              : BOOLEAN;
   -- Flag to indicate that the reference frame (time and bearing) for CPA
   -- estimation has been established. This happens 5 degrees after detection.
Reference_Bearing     : REAL;
   -- Reference bearing for CPA estimation. This value is set 5 degrees
   -- after detection.

Reference_Time        : REAL;
   -- Reference time for CPA estimation. This value is set 5 degrees
   -- after detection.

I_CPA_Flag            : BOOLEAN;
   -- Flag to indicate that CPA estimation has begun. CPA estimation begins
   -- 5 degrees after the reference frame has been established.

Rate_Count            : INTEGER;
   -- Number of bearing rate samples taken. Used in the calculation of the
   -- running bearing rate average.

Ave_Rate              : REAL;
   -- Running bearing rate average at the iteration indicated by Rate_Count.
   -- This average is of the rates during the first 0.5 seconds after CPA_Flag
   -- is set.

Ave_Rate_10_Deg       : REAL;
   -- Bearing rate average 10 degrees after detection. (delta bearing/delta time)

CPA_Bearing           : REAL;
   -- Predicted target bearing at CPA. This angle is with respect to the
   -- reference bearing.
```

```
CPA_Bearing_Rate       : REAL;
-- Predicted target bearing rate at CPA.

CPA_Time               : REAL;
-- Predicted time when target will be at CPA. This time is with respect
-- to the reference time.

Estimated_CPA_Bearing : REAL;
-- Predicted target bearing at CPA.

Estimated_CPA_Time    : REAL;
-- Predicted time to CPA in seconds.

phi                    : REAL;
-- A filtered version of Bearing_At_C.

a, b                   : REAL;

Rate_Polarity          : REAL;

Bearing_Sample_Max : constant INTEGER := 28;
Bearing_Stack : array ( 1 .. Bearing_Sample_Max ) of REAL := (others => 0.0);
Bearing_Index : INTEGER := 0;
```

---

```
- CPA PREDICTION INIT.
  procedure CPA_Prediction_Init is
  begin
     CPA_Flag := FALSE;
     I_CPA_Flag := FALSE;

Reference_Bearing := 0.0;
     Reference_Time := 0.0;

CPA_Bearing := 0.0;
     CPA_Bearing_Rate := 0.0;
     CPA_Time := 0.0;

Estimated_CPA_Bearing := 0.0;
     Estimated_CPA_Time := 0.0;

phi := 0.0;

-- Running average initialization.
     Rate_Count := 0;
     Ave_Rate   := 0.0;

Bearing_Index := 1;

exception  -- Catch exceptions
     when others =>
        -- Set error for later transmission to the STS.
        FCP_Errors.Set( UNKNOWN_ERROR, LAUNCH_CONTROL_PKG, 1 );
  end CPA_Prediction_Init;
```

---

```
-- SUBTRACT ANGLE.

function Sub_Angle ( Angle1, Angle2 : in REAL ) return REAL is

Temp_Angle : REAL := Angle1 - Angle2;
```

```
begin
   while Temp_Angle > Pi loop
      Temp_Angle := Temp_Angle - Two_Pi;
   end loop;
   while Temp_Angle < -Pi loop
      Temp_Angle := Temp_Angle + Two_Pi;
   end loop;
   return Temp_Angle;

exception   -- Catch exceptions
   when others =>
      -- Set error for later transmission to the STS.
      FCP_Errors.Set( UNKNOWN_ERROR, LAUNCH_CONTROL_PKG, 2 );
      return 0.0;
end Sub_Angle;
```

---

```
-- LIMIT ANGLE.  This function limits angles to range from 0 to 2 pi radians.
   function Limit_Angle( Angle : in REAL ) return REAL is Temp_Angle : REAL := Angle;

begin
      while Temp_Angle >= Two_Pi loop
         Temp_Angle := Temp_Angle - Two_Pi;
      end loop;
      while Temp_Angle < 0.0 loop
         Temp_Angle := Temp_Angle + Two_Pi;
      end loop;
      return Temp_Angle;
   exception   -- Catch exceptions
      when others =>
         -- Set error for later transmission to the STS.
         FCP_Errors.Set( UNKNOWN_ERROR, LAUNCH_CONTROL_PKG, 3 );
         return 0.0;
   end Limit_Angle;
```

---

```
-- START LAUNCH EXECUTIVE.  This procedure intializes the Launch Executive for
-- the beginning of a target tracking run.  This will be called following a
-- seismic alert.

procedure Start_Launch_Executive is
   begin

-- If we are initializing because of a detection turn off we don't want
      -- to start the trackers up again. We want to keep tracking.
      if not Detection_Turn_Off then
         Tracker.Start_Trackers;
         Time_Count := 0;
      end if;

Classifier.Start_Classifier(Detection_Turn_Off);

-- Sound_Pressure_Level initialization
      SPL_Target := FALSE;
      Averaged_SPL := 0;

-- Target_Detection initialization
      Detection := FALSE;
      Detection_Turn_Off := FALSE;
```

```
         Had_One_Detection := FALSE;
         Detection_Count := 0;
         Bearing_Array_Index := 0;
         Had_Initial_Bearing_Samples := FALSE;

-- Launch_Decision initialization
         Launch_Decision_Made := FALSE;
         Launch_Ratio := 0.0;
         Launch_Ratio_Computed := FALSE;
         Launch_Basis := 0;
         Launch_Bearing_Rate := 0.0;
         Launch_Decision_Angle := 0.0;
         Finished_Angle1 := FALSE;
         Finished_Angle2 := FALSE;
         Inhibit_Sector2_Start_Time_Reset := FALSE;

-- Aim Sublet Initialization
         Fire_Sublet := FALSE;
         Predictive_Lead_Angle := 0.0;
         Azimuth_Stop := 0;
         Tilt := 1;

Raw_Bearing := 0.0;
         Bearing_Rate := 0.0;
         Target_Class := 3;
         Had_Initial_Rate_Samples := FALSE;
         Bearing_Rate_Total := 0.0;
         Bearing_Rate_Array_Index := 0;

CPA_Prediction_Init;

exception   -- Catch exceptions
        when others =>
           -- Set error for later transmission to the STS.
           FCP_Errors.Set( UNKNOWN_ERROR, LAUNCH_CONTROL_PKG, 4 );
     end Start_Launch_Executive;

------------------------------------------------------------------------

-- ESTIMATE CPA. This procedure provides a prediction of CPA which can be used
-- as part of range containment and to produce a fire-control lead angle
-- solution.

procedure Estimate_CPA ( phi              : in out REAL;
                              a, b             : in out REAL;
                              CPA_Bearing      : in out REAL;
                              CPA_Bearing_Rate : in out REAL;
                              CPA_Time         : in out REAL;
                              Bearing_Delay    : in     REAL) is
     ac     : REAL;
     z      : REAL;
     gain   : REAL;

again1 : constant REAL := 1.0 - dt / 0.25;
     again2 : constant REAL := 1.0 / 0.25;

begin z := ((Time_At_C - dt) / Sin (Bearing_At_C)) ** 2;
         ac := again1 * a + again2 * z * Sub_Angle (Bearing_At_C, phi);
         phi := Limit_Angle (phi + ac * dt / z);

gain := (0.1 + abs (Bearing_Rate) / 0.33) * dt;
         a := a * (1.0 - gain) + ac * gain;
```

```
      b := a / Time_At_C - 1.0 / Tan (phi);

if b * Rate_Polarity > 0.0 then
         -- b has same sign as rate
         CPA_Bearing := ATan (b);

else
         -- b has opposite sign of rate
         CPA_Bearing := Rate_Polarity * Pi + ATan (b);
         b := abs (a * b) / a;
      end if;

if Bearing_Rate * Rate_Polarity > 0.0 then
         -- Bearing_Rate has correct sign
         CPA_Bearing_Rate := Bearing_Rate /
                        Cos (Estimated_CPA_Bearing - Bearing_Delay)**2;
      else
         -- Bearing_Rate has wrong sign -> use alternative rate
         CPA_Bearing_Rate := abs( (1.0 + b*b) / a ) * Rate_Polarity;
      end if;

CPA_Time := b / ((1.0 + b*b) / a);

exception   -- Catch exceptions
      when others =>
         -- Set error for later transmission to the STS.
         FCP_Errors.Set( UNKNOWN_ERROR, LAUNCH_CONTROL_PKG, 5 );
   end Estimate_CPA;
```

---

```
-- LAUNCH DECISION   This Procedure uses either the mode 1 or mode 2
-- launch algorithm.  If the SPL_Target flag is set, the Sound Pressure
-- Level is high and mode 2 is used.

procedure Launch_Decision( Smooth_Bearing      : in  REAL;
                              Detect_Bearing      : in  REAL;
                              SPL_Bearing         : in  REAL;
                              Magnetic_Alert      : in  BOOLEAN;
                              Current_Run_Time    : in  REAL;
                              Detection_Time      : in  REAL;
                              Predictive_Lead_Angle : in out REAL;
                              Launch_Decision_Made  : in out BOOLEAN;
                              Launch_Basis          : in out POSITIVE_8;
                              Launch_Decision_Angle : in out REAL) is Delta_Time_Sector1 : REAL;
   Delta_Time_Sector2 : REAL;

Launch_Abort    : BOOLEAN;
   Bearing_Delay   : REAL;

Launch_Flag     : BOOLEAN;

begin
      if Detection then
         if Magnetic_Alert then
            -- Magnetic alert has priority over Ratio and SPL launches
            Launch_Decision_Made  := TRUE;
            Launch_Decision_Angle := Smooth_Bearing;
            Launch_Basis          := 4;
         else
```

```
-- - This section calculates the launch ratio.

-- While still within Ratio_Launch_Hold_Limit degrees of detection angle don't
-- start the ratio launch algorithm
if abs( Smooth_Bearing - Detect_Bearing )
   < Ratio_Launch_Hold_Limit then
     Sector1_Start_Time := Current_Run_Time;
     Finished_Angle1 := FALSE;
     Finished_Angle2 := FALSE;
end if;

-- We start monitoring angles at detection
-- This is the start of the first sector.

-- First reset the Finished flag to ensure that we get the
-- time of the last bearing angle that crossed the sector.
if ( Abs( Smooth_Bearing - Detect_Bearing ) < Ratio_Delta1 ) then
     Finished_Angle1 := FALSE;
end if;
if not Finished_Angle1
   and ( Abs( Smooth_Bearing - Detect_Bearing ) >= Ratio_Delta1 ) then
     -- We have tracked through first Sector since detection, record
     -- time and indicate that we are finished with Delta1.
     -- This is the end of the first sector.
     Sector1_end_Time := Current_Run_Time;
     Finished_Angle1 := TRUE;
end if;

-- First reset the Finished flags to ensure that we get the time
-- of the last bearing angle that crossed Delta2.
if (Abs( Smooth_Bearing - Detect_Bearing ) < Ratio_Delta2)
   and
   not Inhibit_Sector2_Start_Time_Reset then
     Finished_Angle2 := FALSE;
end if;
-- If we get far enough through sector 2, don't allow
-- the reseting of Sector2_Start_Time time.
if (Abs(Smooth_Bearing-Detect_Bearing) >= Inhibit_Sector2_Limit ) then
     Inhibit_Sector2_Start_Time_Reset := TRUE;
end if;

if not Finished_Angle2
   and (Abs(Smooth_Bearing-Detect_Bearing) >= Ratio_Delta2) then
     -- We have tracked through second delta since detection, record
     -- time and indicate that we are finished with Detla2.
     -- This is the start of the second sector.
     Sector2_Start_Time := Current_Run_Time;
     Finished_Angle2 := TRUE;
end if;
if (Abs(Smooth_Bearing-Detect_Bearing) >= Launch_Delta) then
     -- We have completed tracking over the two sectors.
     -- Compute ratio and check for launch or launch abort
     if not Launch_Ratio_Computed then
        Delta_Time_Sector1 := Sector1_end_Time - Sector1_Start_Time;
        Delta_Time_Sector2 := Current_Run_Time - Sector2_Start_Time;
        Launch_Ratio := Delta_Time_Sector1 / Delta_Time_Sector2;
        Launch_Ratio_Computed := TRUE;
     end if;
end if;

if Ratio_Launch_Enabled then
   -- CPA Estimator
```

```
if (CPA_Flag) and
   (abs (Sub_Angle (Smooth_Bearing, Detect_Bearing)) <= 5.0 * DTR) then CPA_Prediction_Init;

end if;

if (not CPA_Flag) and
   (abs (Sub_Angle (Smooth_Bearing, Detect_Bearing)) >= 10.0 * DTR) then -- Establish the CPA estimation reference frame (time, and bearing)
   -- 10 degrees after detection.
   --
   -- Determine rate polarity.
   if Sub_Angle (Smooth_Bearing, Detect_Bearing) < 0.0 then
      Rate_Polarity := -1.0;
   else
      Rate_Polarity := 1.0;
   end if;

Ave_Rate_10_Deg := Sub_Angle(Smooth_Bearing, Detect_Bearing)
                      / ( Current_Run_Time - Detection_Time );

Reference_Bearing := Smooth_Bearing;
   Reference_Time := Current_Run_Time;
   CPA_Flag := TRUE;

end if;

if CPA_Flag then

-- Calculate time elapsed and the angle the target has passed
   -- through since the CPA estimation reference frame was
   -- established.
   --
   Time_At_C := Current_Run_Time - Reference_Time;
   Bearing_At_C := Sub_Angle (Smooth_Bearing, Reference_Bearing);

if not I_CPA_Flag then

-- Average the target bearing rate for the first 0.5 seconds
      -- after reference frame has been established.

if (Time_At_C < 0.5) then

Rate_Count := Rate_Count + 1;
         Ave_Rate := ( Ave_Rate *
                       REAL (Rate_Count - 1) +
                       Bearing_Rate ) / REAL (Rate_Count);

-- Make sure that "a" has the correct sign.
         -- Use average bearing rate for 10 deg after detection
         -- if Ave_Rate is too small.  We also will use the
         -- 10 deg averaged rate if the Ave_Rate sign is
         -- different than Rate_Polarity (i.e product is neg)
         if Ave_Rate * Rate_Polarity < 1.0*DTR then
            a := 1.0 / Ave_Rate_10_Deg;
         else
            -- Use 0.5 second average rate
            a := 1.0 / Ave_Rate;
         end if;

end if;
   end if;
```

```
if abs (phi) > 5.0 * DTR then

-- It has been 15 degrees since detection, so start
   -- CPA estimation.
   --
   I_CPA_Flag := TRUE;

end if;

-- Store smooth bearing estimate for past Bearing_Sample_Max
-- iterations so lag can be compensated in the CPA bearing
-- rate calculation.
--
Bearing_Index := Bearing_Index + 1;
if Bearing_Index > Bearing_Sample_Max then
   Bearing_Index := 1;
end if;
Bearing_Delay := Bearing_Stack (Bearing_Index);
Bearing_Stack(Bearing_Index) := Smooth_Bearing;

if (I_CPA_Flag) and (Time_At_C > 0.5) then if abs (phi) < 1.0 * DTR then
      I_CPA_Flag := FALSE;
      Reference_Bearing := Smooth_Bearing;
      Reference_Time := Current_Run_Time;
   else
      Estimate_CPA ( phi,
                     a, b,
                     CPA_Bearing,
                     CPA_Bearing_Rate,
                     CPA_Time,
                     Bearing_Delay );
   end if;

else phi := Bearing_At_C;

end if;

Estimated_CPA_Bearing := Reference_Bearing + CPA_Bearing;
Estimated_CPA_Time := Reference_Time + CPA_Time;
-- launch logic and computations
if (abs (Bearing_At_C) > 40.0 * DTR)
   and then
   abs(Sub_Angle(Estimated_CPA_Bearing,Smooth_Bearing)) < 40.0*DTR
   and then
   (Launch_Ratio_Computed) then if (Launch_Ratio > 7.5) and (CPA_Bearing_Rate < 15.0 * DTR) then
      Launch_Flag := (Estimated_CPA_Time - Current_Run_Time < 0.0);
   else
      Launch_Flag := (Estimated_CPA_Time - Current_Run_Time < 8.0);
   end if;

if Launch_Flag then

-- Set launch abort flag if ratio <= threshold.
      if Launch_Ratio <= Ratio_Threshold then Launch_Abort := TRUE;
         Launch_Basis := 6;      -- Basis = launch abort
         Launch_Decision_Made := TRUE;
```

```
            else

Predictive_Lead_Angle := ATan(8.1 *
                                              CPA_Bearing_Rate +
                                              Tan (phi - CPA_Bearing)) +
                                          CPA_Bearing +
                                          Reference_Bearing;
                Launch_Decision_Made := TRUE;
                Launch_Basis := 1;
                Launch_Decision_Angle := Smooth_Bearing;

end if;  -- Launch_Abort end if;  -- Launch_Flag end if;

end if;  -- CPA_Flag end if;

if SPL_Target and SPL_Launch_Enabled then
        -- Launch Mode 2 - This Procedure basis a launch decision on the
        -- Sound Pressure Level at acoustic detection.
        if (Abs( Smooth_Bearing - SPL_Bearing ) >= SPL_Delta2) then
          -- Launch mode 2 (SPL)
          Launch_Decision_Made := TRUE;
          Launch_Basis := 2;
          Launch_Decision_Angle := Smooth_Bearing;
        end if;
      end if;
    end if;
  end if;

exception  -- Catch exceptions
    when others =>
        -- Set error for later transmission to the STS.
        FCP_Errors.Set( UNKNOWN_ERROR, LAUNCH_CONTROL_PKG, 6 );
  end Launch_Decision;

-----------------------------------------------------------------------------

-- AIM SUBLET. This Procedure aims the sublet after the launch decision has been
-- made. The tilt and azimuth stop is determine for all launch basis. The
-- bearing rate is averaged over the last 10 iterations to get a smoother rate
-- for aiming.

Procedure Aim_Sublet( Launch_Decision_Made   : in BOOLEAN;
                        Launch_Decision_Angle  : in REAL;
                        Launch_Basis           : in POSITIVE_8;
                        Launch_Ratio           : in REAL;
                        Bearing_Rate           : in REAL;
                        Detect_Angle           : in REAL;
                        Smooth_Bearing         : in REAL;
                        Predictive_Lead_Angle  : in out REAL;
                        Tilt                   : in out POSITIVE_8;
                        Azimuth_Stop           : in out POSITIVE_8) is Bearing_Rate_Average : REAL;
  Elevation,Xp,Yp,Zp,Zb,Xbb,Ybb,Zbb,Cos1,Cos2,Sin1,Sin2 : REAL;

begin

-- Keep a running total of the last 10 bearing rate samples to be
      -- averaged for a launch bearing rate.
```

```
Bearing_Rate_Array_Index := Bearing_Rate_Array_Index + 1;
if Had_Initial_Rate_Samples then
   -- Subtract oldest value and add in newest value.
   Bearing_Rate_Total := Bearing_Rate_Total
                       - Bearing_Rate_Array( Bearing_Rate_Array_Index )
                       + Bearing_Rate;
else
   Bearing_Rate_Total := Bearing_Rate_Total + Bearing_Rate;
end if;

-- Load up new Bearing_Rate value
Bearing_Rate_Array( Bearing_Rate_Array_Index ) := Bearing_Rate;
-- Check if we have had 10 Bearing_Rate samples yet and reset index
if Bearing_Rate_Array_Index = 10 then
   -- Set flag to make sure we've had initial 10 samples
   Had_Initial_Rate_Samples := TRUE;
   -- Reset index
   Bearing_Rate_Array_Index := 0;
end if;

-- If a launch decision has been made, sublet not yet fired, and
-- not a launch abort, perform the aim sublet function.
if Launch_Decision_Made and not Fire_Sublet and Launch_Basis /= 6 then -- First take average of last 10 bearing rate samples to be passed
   -- to the aim routine.
   Bearing_Rate_Average := Bearing_Rate_Total / 10.0;
-- Use the opposite of detect angle (+pi) and a computed offset for
-- magnetic alert.  Check for launch bassis of 4 for magnetic launch
if Launch_Basis = 4 then
   -- Add 180 to detect angle and fire.
   Predictive_Lead_Angle := Detect_Angle + Pi;

-- Check for SPL launch (basis = 2)
elsif Launch_Basis = 2 then
   -- SPL launch
   -- We must determine the direction the target is traveling.  This
   -- is based on the original angle at detection and the lauch angle.
   if Bearing_Rate_Average < 0.0 then
      -- Target is traveling in the counter-clockwise direction.
      -- Subtract adjustment for filter lagging.  Note that the Bearing_Rate
      -- is signed so it is added instead of subtracted.
      Predictive_Lead_Angle := Smooth_Bearing - 40.0*DTR
                + ATan(0.839 + 0.238 * Bearing_Rate_Average * RTD);
   else
      -- Target is traveling in the clockwise direction.
      -- Add adjustment for filter lagging.
      Predictive_Lead_Angle := Smooth_Bearing + 40.0*DTR
                + ATan(-0.839 + 0.238 * Bearing_Rate_Average * RTD);
   end if;
-- If not 2 or 4, Launch_Basis = 1
   -- Ratio Launch/CPA aim.  Predictive_Lead_Angle has already been
   -- calculated by the Launch_Decision procedure.
end if;

-- Adjust stop and tilt for ground slope of platform. Slope_Rotation_X
-- and Slope_Rotation_Y are input from the STS and are the rotation
-- angles about their respective axis.  Predictive_Lead_Angle is the
-- desired azimuth and Elevation is the desired elevation for a flat
-- surface.

-- Set Elevation to 69 deg. ( Tilt 1 )
Elevation := 1.2043;
```

```
-- Compute x,y,z components of projected launch vector.
Cos1 := Cos( Elevation );
Xp := Cos1 * Cos( Predictive_Lead_Angle );
Yp := Cos1 * Sin( Predictive_Lead_Angle );
Zp := Sin( Elevation );

-- Compute x,y,z components translated to base frame with tilts
-- factored in.
Cos1 := Cos( Slope_Rotation_X );
Sin1 := Sin( Slope_Rotation_X );
Cos2 := Cos( Slope_Rotation_Y );
Sin2 := Sin( Slope_Rotation_Y );
Zb  := Zp * Cos1 - Yp * Sin1;
Xbb := Xp * Cos2 - Zb * Sin2;
Ybb := Zp * Sin1 + Yp * Cos1;
Zbb := Xp * Sin2 + Zb * Cos2;

-- Compute Elevation w/r Base.
Elevation := Asin( Zbb );

Had_One_Detection   : in out BOOLEAN;
                           Detection_Turn_Off  : in out BOOLEAN ) is n : constant INTEGER := 50;        -- 50 bearing samples
Difference : REAL;
Standard_Deviation : REAL;

begin
   -- If the average of the last 50 SPL samples is 0, then don't
   -- run the detection logic.
   if SPL_Ave /= 0 then
      -- Bump array index
      Bearing_Array_Index := Bearing_Array_Index + 1;
      -- Load new raw bearing sample into array
      Raw_Bearing_Array( Bearing_Array_Index ) := Raw_Bearing;
      -- For each run, we must have 50 samples before starting to check
      -- for detection.
      if Bearing_Array_Index = n then
         Had_Initial_Bearing_Samples := TRUE;
         Bearing_Array_Index := 0;
      end if;

if Had_Initial_Bearing_Samples then
      Standard_Deviation := 0.0;
      for i in 1 .. n loop
         Difference := abs( Raw_Bearing_Array(i) - Smooth_Bearing );
         -- Check for crossing over line between 0 and 2pi
         while Difference > Pi loop
            Difference := Difference - Two_Pi;
         end loop;
         Standard_Deviation := Standard_Deviation + Difference**2;
      end loop;
      Standard_Deviation := SQRT( Standard_Deviation / REAL(n-1) );
      if ( Standard_Deviation < Detect_Threshold ) then
         Detection_Count := Detection_Count + 1;
      else
         Detection_Count := 0;
      end if;
      if Detection_Count >= 8
         and
```

```
                ( not Detection ) then
                Detection := TRUE;
                Detect_Time := Current_Run_Time;
                Detect_Bearing := Smooth_Bearing;
                Detection_Turn_Off := FALSE;
                Had_One_Detection := TRUE;
            elsif ( Standard_Deviation > Detect_Turn_Off_Threshold ) and
                   ( not Detection_Turn_Off ) and
                   ( Had_One_Detection ) then
                Detection := FALSE;
                Detection_Turn_Off := TRUE;
            end if;
        end if;
    end if;

exception   -- Catch exceptions
    when others =>
            -- Compute Azimuth w/r Base.
            Predictive_Lead_Angle := Asin( Ybb / Cos( Elevation ) );

-- Correct azimuth if in wrong quadrant.
            if Xbb < 0.0 then
                Predictive_Lead_Angle := pi - Predictive_Lead_Angle;
            end if;

-- Compute optimum tilt and adjust Lead from desired elevation angle.
            if Elevation > 76.0*DTR then
                Tilt := 0;
                Predictive_Lead_Angle := Predictive_Lead_Angle + 38.55*DTR;
            elsif Elevation > 67.0*DTR then
                Tilt := 1;
            else
                Tilt := 2;
                Predictive_Lead_Angle := Predictive_Lead_Angle - 32.65*DTR;
            end if;

-- Get Azimuth Stop from predicted lead angle.
            case INTEGER( Limit_Angle( Predictive_Lead_Angle ) * RTD ) is
                when 0   .. 15  => Azimuth_Stop := 1;
                when 16  .. 45  => Azimuth_Stop := 2;
                when 46  .. 75  => Azimuth_Stop := 3;
                when 76  ..105  => Azimuth_Stop := 4;
                when 106..135   => Azimuth_Stop := 5;
                when 136..165   => Azimuth_Stop := 6;
                when 166..195   => Azimuth_Stop := 7;
                when 196..225   => Azimuth_Stop := 8;
                when 226..255   => Azimuth_Stop := 9;
                when 256..285   => Azimuth_Stop := 10;
                when 286..315   => Azimuth_Stop := 11;
                when 316..345   => Azimuth_Stop := 12;
                when 346..360   => Azimuth_Stop := 1;
                when others     => null;
            end case;

end if;

exception   -- Catch exceptions
        when others =>
            -- Set error for later transmission to the STS.
            FCP_Errors.Set( UNKNOWN_ERROR, LAUNCH_CONTROL_PKG, 7 );
end Aim_Sublet;
```

-- TARGET DETECTION  This Procedure implements acoustic detection based on
-- the standard deviation of the raw bearing to the alpha-beta filtered bearing.

```
    Procedure Target_Detection( SPL_Ave          : in POSITIVE_16;
                                Raw_Bearing      : in REAL;
                                Smooth_Bearing   : in REAL;
                                Detection        : in out BOOLEAN;
                                Detect_Time      : in out REAL;
                                Detect_Bearing   : in out REAL;
        -- Set error for later transmission to the STS.
        FCP_Errors.Set( UNKNOWN_ERROR, LAUNCH_CONTROL_PKG, 8 );
    end Target_Detection;
```

---

-- GET.  This procedure is called at a 20 Hz rate and returns the information
-- needed for STS status data reporting.

```
    procedure Get( Launch_Data : out LAUNCH_DATA_TYPE ) is
    begin
        Launch_Data.Bearing := Limit_Angle( Smooth_Bearing );
        Launch_Data.Raw_Bearing := Limit_Angle( Raw_Bearing );
        Launch_Data.Bearing_Rate := Limit_Angle( Bearing_Rate );
        Launch_Data.Time_to_CPA := Estimated_CPA_Time - Current_Run_Time;
        Launch_Data.CPA_Estimate := Limit_Angle( Estimated_CPA_Bearing );
        Launch_Data.Predictive_Lead_Angle := Limit_Angle( Predictive_Lead_Angle );
        Launch_Data.Target_Class := Target_Class;
        Launch_Data.Azimuth_Stop := Azimuth_Stop;
        Launch_Data.Tilt := Tilt;

-- Limit Launch_Ratio to 99:9 for transmit to STS.
        if Launch_Ratio > 99.9 then
            Launch_Data.Launch_Ratio := 99.9;
        else
            Launch_Data.Launch_Ratio := Launch_Ratio;
        end if;

Launch_Data.Launch_Basis := Launch_Basis;
        Launch_Data.Fire_Command := Fire_Sublet;
        Launch_Data.Detection := Detection;
        Launch_Data.SPL := Averaged_SPL;

exception  -- Catch exceptions
        when others =>
            -- Set error for later transmission to the STS.
            FCP_Errors.Set( UNKNOWN_ERROR, LAUNCH_CONTROL_PKG, 9 );
    end Get;
```

---

-- LAUNCH EXECUTIVE.  This procedure is the executive for controlling the launch
-- decision process.  It is called at a 40 Hz rate and controls target tracking,
-- target classification, launch control, and fire/aim logic.

```
    procedure Launch_Executive( Raw_Residues      : in RESIDUES;
                                Raw_SPL           : in POSITIVE_16;
                                Low_Pass_Seismic  : in POSITIVE_16;
                                High_Pass_Seismic : in POSITIVE_16;
                                Low_Pass_Acoustic : in POSITIVE_16;
                                High_Pass_Acoustic: in POSITIVE_16;
                                Magnetic_Alert    : in BOOLEAN ) is
```

```
begin
   -- Update the time of the current run every call (40hz)
   Time_Count := Time_Count + 1;
   -- Dividing count by 40 gives seconds
   Current_Run_Time := REAL(Time_Count) / 40.0;

Tracker.Tracker_Executive( Raw_Residues,
                           Raw_Bearing,
                           Detection,
                           Current_Run_Time,
                           Smooth_Bearing,
                           Bearing_Rate );

-- Check for target detection by applying
-- the standard deviation to the output of the tracker.
if ( not Launch_Decision_Made ) and ( Current_Run_Time > 0.40 ) then
   Target_Detection( Averaged_SPL,
                     Raw_Bearing,
                     Smooth_Bearing,
                     Detection,
                     Detect_Time,
                     Detect_Bearing,
                     Had_One_Detection,
                     Detection_Turn_Off);
end if;

-- Process Sound_Pressure_Level.  SPL_Target will return TRUE if the
-- average of the last 50 SPL samples exceeds the limit and the bearing
-- rate also exceeds the limit.
Classifier.Process_SPL( Raw_SPL,
                        Detection,
                        Detect_Bearing,
                        Smooth_Bearing,
                        Bearing_Rate,
                        Averaged_SPL,
                        SPL_Bearing,
                        SPL_Target);

-- Make a decision to launch or not.
if not Launch_Decision_Made then
   Launch_Decision( Smooth_Bearing,
                    Detect_Bearing,
                    SPL_Bearing,
                    Magnetic_Alert,
                    Current_Run_Time,
                    Detect_Time,
                    Predictive_Lead_Angle,
                    Launch_Decision_Made,
                    Launch_Basis,
                    Launch_Decision_Angle);
end if;

-- Classify the target of interest using seismic and acoustic
-- filtered data.
Classifier.Target_Classifier( Low_Pass_Seismic,
                              High_Pass_Seismic,
                              Low_Pass_Acoustic,
                              High_Pass_Acoustic,
                              Launch_Decision_Made,
                              Target_Class);

-- Aim sublet if nessessary.
Aim_Sublet( Launch_Decision_Made,
```

```
                Launch_Decision_Angle,
                Launch_Basis,
                Launch_Ratio,
                Bearing_Rate,
                Detect_Bearing,
                Smooth_Bearing,
                Predictive_Lead_Angle,
                Tilt,
                Azimuth_Stop);

-- Fire sublet once if launch decision has been made and not launch abort.
      -- Launch_Sublet is an entry to a task which is set at the highest
      -- priority due to strict timing requirements for the launcher hardware.
      if Launch_Decision_Made
         and then
         Launch_Basis /= 6
         and then
         not Fire_Sublet then
         Fire_Sublet := TRUE;
         -- Only send Aim_Code if Launcher is enabled. (i.e. Hardware exists)
         if Launcher_Enabled then
             Launcher_Iface.Launcher_Iface_Task.Launch_Sublet(Azimuth_Stop,Tilt);
         end if;
      end if;

exception  -- Catch exceptions
      when others =>
           -- Set error for later transmission to the STS.
           FCP_Errors.Set( UNKNOWN_ERROR, LAUNCH_CONTROL_PKG, 10 );
   end Launch_Executive;

end Launch_Control;
```

Having thus described the invention, what is claimed is:

1. A target engagement system, comprising:
   (a) detecting means for receiving an azimuth signal indicating the bearing of a target and for issuing a detect signal when said received azimuth signal meets predetermined criteria; and
   (b) engagement determining means responsive to said detect signal for monitoring changes in said azimuth signal and for enabling the engagement of said target when the changes in said azimuth signal indicate that the target is in range.

2. The system of claim 1, wherein said azimuth signal includes raw azimuth and smooth azimuth and wherein said detecting means includes computing means for computing the standard deviation of said raw azimuth relative to said smooth azimuth and for comparing said computed standard deviation to a detection criteria.

3. The system of claim 2, wherein said computing means includes comparison means for indicating said detection criteria has been met when the computed standard deviation is less than 12° for 0.2 second.

4. The system of claim 3, wherein said detecting means further includes engagement abort means for preventing target engagement if the computed standard deviation is greater than 60° during any update.

5. The system of claim 3, wherein said engagement determining means includes azimuth recording means for recording a detect azimuth associated with the issuance of the detect signal.

6. The system of claim 5, wherein said engagement determining means further includes sector crossing timing means for calculating the time required for the detected target to cross a first and a second sector, said first sector covering 20° from a reference line corresponding to the detect azimuth, said second sector covering 20° but displaced to cover a region from 30° to 50° relative to the reference line, such that a first calculated time interval designates the time it takes the target to move from the detect azimuth to a line at a bearing 20° from said detect azimuth and a second calculated time interval designates the time it takes the target to move from a line at a bearing 30° from said detect azimuth to a line at a bearing 50° from said detect azimuth.

7. The system of claim 6, wherein said first time interval is calculated from the last crossing of said detect azimuth to the last crossing of the 20° bearing line and wherein said second time interval is calculated from the last crossing of the 30° bearing line to the first crossing of the 50° bearing line.

8. The system of claim 6, wherein said engagement determining means further includes engagement criteria means for determining if a target should be engaged, such engagement criteria means being operable for calculating a ratio of said first time interval to said second time interval and for enabling engagement if said ratio is greater than 2.0.

9. A target engagement method, comprising the steps of:
   (a) receiving an azimuth signal associated with a target and including raw azimuth, tracking the azimuth signal against predetermined detection criteria and issuing a detect signal when said azimuth signal meets said detection criteria;

(b) tracking changes in raw azimuth in response to said detect signal; and (c) issuing a target engagement signal when the target moves in such a way as to meet predetermined engagement criteria.

10. The method of claim 9, wherein the azimuth signal further includes smooth azimuth and the step of tracking the azimuth signal against predetermined detection criteria includes computing the standard deviation of raw azimuth relative to smooth azimuth.

11. The method of claim 10, wherein the step of issuing a detect signal when said azimuth signal meets said detection criteria includes issuing a detect signal once the standard deviation decreases below 12° for 0.2 second.

12. The method of claim 10, wherein the step of tracking changes in raw azimuth includes halting said tracking if the standard deviation increases above 60° during any update.

13. The method of claim 11, wherein the step of tracking changes in raw azimuth further includes recording a detect azimuth associated with issuance of the detect signal.

14. The method of claim 13, wherein the step of tracking changes in raw azimuth further includes measuring the time required for the target to cross two sectors, said first sector covering 20° from a reference line corresponding to the detect azimuth, said second sector covering 20° but displaced to cover a region from 30° to 50° relative to the reference line, such that a first time interval is calculated from the time required for the target to move from the detect azimuth to a bearing 20° removed from the reference line thereafter and a second time interval is calculated from the time required for the target to move from 30° after detect azimuth to 50° after detect azimuth.

15. The method of claim 14, wherein the time required for the target to move across said first sector is calculated from the last crossing of said detect azimuth to the last crossing of the 20° bearing and wherein the time required for the target to move across said second sector is calculated from the last crossing of the 30° bearing to the first crossing of the 50° bearing.

16. The method of claim 15, wherein the step of issuing a target engagement signal includes calculating a ratio of said first time interval to said second time interval and issuing said target engagement signal if said ratio is greater than 2.0.

17. The system of claim 1, wherein said engagement determining means includes launch decision means for monitoring changes in the bearing of said target and for enabling the engagement of said target when the changes in its bearing indicate that it is in range.

18. A method for engaging a target, comprising:
receiving an azimuth signal including a target bearing;
measuring a first time interval as the time it takes for a target to move through a predetermined first bearing angle;
measuring a second time interval as the time it takes for a target to move through a predetermined second bearing angle;
engaging said target if the ratio of said first time interval to said second time interval is greater than a predetermined ratio.

19. The method according to claim 18 wherein the method further includes:
providing an average target bearing;
comparing the standard deviation of the target bearing and the average target bearing to a predetermined deviation limit; and
if the standard deviation is greater than said deviation limit, preventing engagement of the target.

20. A method for engaging a target, comprising the steps of:
(a) receiving an azimuth signal including a target bearing and an average target bearing;
(b) waiting until the standard deviation of the target bearing and the average target bearing is less than a predetermined first deviation limit;
(c) recording the target bearing;
(d) measuring a first time interval as the time it takes for the target to move through a predetermined bearing angle; and
(e) measuring a second time interval as the time it takes for the target to move through a predetermined second bearing angle; and
(f) engaging said target if the ratio of said first time interval to said second time interval is greater than a predetermined ratio.

21. The method according to claim 20 wherein the method further includes halting the measurement of said first and second time intervals if the standard deviation exceeds a predetermined second deviation limit during measurement of the first and second time intervals.

* * * * *